United States Patent
Stuntebeck et al.

(10) Patent No.: US 11,824,644 B2
(45) Date of Patent: Nov. 21, 2023

(54) CONTROLLING ELECTRONICALLY COMMUNICATED RESOURCES

(71) Applicant: AirWatch LLC, Atlanta, GA (US)

(72) Inventors: Erich Stuntebeck, Marietta, GA (US); John Dirico, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 589 days.

(21) Appl. No.: 15/430,184

(22) Filed: Feb. 10, 2017

(65) Prior Publication Data

US 2017/0155660 A1 Jun. 1, 2017

Related U.S. Application Data

(63) Continuation of application No. 13/828,922, filed on Mar. 14, 2013, now abandoned.

(51) Int. Cl.
*H04L 9/40* (2022.01)
*G06F 21/10* (2013.01)

(52) U.S. Cl.
CPC ............ *H04L 63/104* (2013.01); *G06F 21/10* (2013.01); *H04L 63/0435* (2013.01);
(Continued)

(58) Field of Classification Search
CPC ...... G06F 21/6218; G06F 21/00; G06F 21/62; G06F 2221/2141; G06F 21/31; G06F 21/60; G06F 16/122; G06F 21/6245; G06F 2221/2113; G06F 3/0643; G06F 16/972; G06F 9/5044; G06F 9/5055;
(Continued)

(56) References Cited

U.S. PATENT DOCUMENTS

| 4,679,226 A | 7/1987 | Muehleisen |
| 5,237,614 A | 8/1993 | Weiss |

(Continued)

FOREIGN PATENT DOCUMENTS

| CA | 2149337 | 6/1994 |
| EP | 2675137 | 12/2013 |

(Continued)

OTHER PUBLICATIONS

Margaret Rouse, Client/Server (client/server model, client/server architecture), Rouser, Oct. 30, 2008, Searchnetwork, pp. 1-2 (Year: 2008).*

(Continued)

*Primary Examiner* — Tonia L Dollinger
*Assistant Examiner* — Linh T. Nguyen
(74) *Attorney, Agent, or Firm* — Thomas | Horstemeyer, LLP.

(57) ABSTRACT

Methods, systems, and devices provide control over resources electronically communicated among computing devices. In some embodiments, a management application identifies multiple entities for communicating electronic content. The management application determines that at least a subset of the entities required for communicating the electronic content is available for electronic communication. The management application authorizes communication of at least some of the electronic content among the entities in response to determining that the required subset of entities is available for electronic communication.

20 Claims, 6 Drawing Sheets

(52) U.S. Cl.
CPC .......... *H04L 63/102* (2013.01); *H04L 63/107* (2013.01); *H04L 63/20* (2013.01); *G06F 2221/0713* (2013.01); *G06F 2221/2143* (2013.01); *H04L 63/061* (2013.01)

(58) Field of Classification Search
CPC ...... G06F 3/1226; G06F 3/1236; G06F 9/468; H04L 47/20; H04L 47/627; H04L 63/0227; H04L 63/10; H04L 63/102; H04L 63/20; H04L 63/105; H04L 43/08; H04L 47/70; H04L 67/30; H04L 67/306; H04L 67/303; H04L 63/12; H04L 63/0807; H04L 67/14; H04W 12/06; H04W 12/08; H04W 88/02
USPC ....... 709/203, 217, 219, 226, 224, 204, 225, 709/229, 238; 726/4, 27, 5, 1, 2, 17, 18, 726/19, 21, 26, 7
See application file for complete search history.

(56) References Cited

U.S. PATENT DOCUMENTS

| | | | |
|---|---|---|---|
| 5,446,888 A | 8/1995 | Pyne | |
| 5,574,786 A | 11/1996 | Dayan et al. | |
| 5,625,869 A | 4/1997 | Nagamatsu et al. | |
| 5,631,947 A | 5/1997 | Wittstein et al. | |
| 5,740,395 A | 4/1998 | Wells et al. | |
| 5,799,068 A | 8/1998 | Kikinis et al. | |
| 5,826,265 A | 10/1998 | Van et al. | |
| 5,864,683 A | 1/1999 | Boebert et al. | |
| 5,870,459 A | 2/1999 | Phillips et al. | |
| 5,928,329 A | 7/1999 | Clark et al. | |
| 5,961,590 A | 10/1999 | Mendez et al. | |
| 5,966,081 A | 10/1999 | Chesnutt | |
| 5,974,238 A | 10/1999 | Chase | |
| 5,987,609 A | 11/1999 | Hasebe | |
| 6,021,492 A | 2/2000 | May | |
| 6,023,708 A | 2/2000 | Mendez et al. | |
| 6,078,260 A | 6/2000 | Desch | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,167,253 A | 12/2000 | Farris et al. | |
| 6,233,341 B1 | 5/2001 | Riggins | |
| 6,269,369 B1 | 7/2001 | Robertson | |
| 6,286,098 B1 * | 9/2001 | Wenig | H04L 63/0442 713/151 |
| 6,370,629 B1 | 4/2002 | Hastings et al. | |
| 6,463,470 B1 | 10/2002 | Mohaban et al. | |
| 6,480,096 B1 | 11/2002 | Gutman et al. | |
| 6,529,949 B1 | 3/2003 | Getsin et al. | |
| 6,560,772 B1 | 5/2003 | Slinger | |
| 6,578,069 B1 | 6/2003 | Hopmann et al. | |
| 6,606,662 B2 | 8/2003 | Nagasaki | |
| 6,636,489 B1 | 10/2003 | Fingerhut | |
| 6,668,322 B1 | 12/2003 | Wood et al. | |
| 6,694,335 B1 | 2/2004 | Hopmann et al. | |
| 6,697,836 B1 * | 2/2004 | Kawano | H04L 67/1034 709/219 |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 | 7/2004 | Riggins | |
| 6,779,118 B1 | 8/2004 | Kudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,017,105 B2 | 3/2006 | Flanagin et al. | |
| 7,032,181 B1 | 4/2006 | Farcasiu | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,107,339 B1 | 9/2006 | Wolters | |
| 7,184,801 B2 | 2/2007 | Farcasiu | |
| 7,191,058 B2 | 3/2007 | Aird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,350,229 B1 | 3/2008 | Lander | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,398,393 B2 | 7/2008 | Mont et al. | |
| 7,430,757 B1 | 9/2008 | Chari et al. | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,448,023 B2 | 11/2008 | Chory et al. | |
| 7,475,152 B2 | 1/2009 | Chan et al. | |
| 7,480,907 B1 | 1/2009 | Marolia et al. | |
| 7,496,847 B2 | 2/2009 | Koehane et al. | |
| 7,496,957 B2 | 2/2009 | Howard et al. | |
| 7,539,665 B2 | 5/2009 | Mendez | |
| 7,543,146 B1 | 6/2009 | Karandikar et al. | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,657,746 B2 | 2/2010 | Paramasivam et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton et al. | |
| 7,735,112 B2 | 6/2010 | Kim et al. | |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,769,394 B1 | 8/2010 | Zhu | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,865,469 B2 | 1/2011 | Hopmann et al. | |
| 7,873,959 B2 | 1/2011 | Zhu et al. | |
| 7,890,091 B2 | 2/2011 | Puskoor et al. | |
| 7,895,296 B1 | 2/2011 | Dayan | |
| 7,912,896 B2 | 3/2011 | Wolovitz et al. | |
| 7,917,641 B2 | 3/2011 | Crampton | |
| 7,921,155 B2 | 4/2011 | Harrow et al. | |
| 7,970,386 B2 | 6/2011 | Bhat et al. | |
| 7,991,697 B2 | 8/2011 | Fransdonk | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,051,491 B1 * | 11/2011 | Cavage | G06F 21/6218 726/30 |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,095,124 B2 * | 1/2012 | Balia | H04M 3/42161 455/418 |
| 8,108,687 B2 | 1/2012 | Ellis et al. | |

(56) References Cited

U.S. PATENT DOCUMENTS

| | | |
|---|---|---|
| 8,117,344 B2 | 2/2012 | Mendez et al. |
| 8,127,133 B2 | 2/2012 | Cross et al. |
| 8,150,431 B2 | 4/2012 | Wolovitz et al. |
| 8,155,587 B2 | 4/2012 | Sasai et al. |
| 8,166,106 B2 | 4/2012 | Biggs et al. |
| 8,201,216 B2 | 6/2012 | Cha et al. |
| 8,214,862 B1 | 7/2012 | Lee et al. |
| 8,225,381 B2 | 7/2012 | Lemke |
| 8,276,209 B2 | 9/2012 | Knibbeler et al. |
| 8,332,350 B2 | 12/2012 | Pulfer et al. |
| 8,353,044 B1 * | 1/2013 | Jones et al. ............ H04L 29/06 726/25 |
| 8,407,345 B2 | 3/2013 | Lim |
| 8,411,834 B2 | 4/2013 | Gopinath et al. |
| 8,423,511 B1 | 4/2013 | Bhatia |
| 8,456,293 B1 | 6/2013 | Trundle et al. |
| 8,472,874 B2 | 6/2013 | Tang et al. |
| 8,504,831 B2 | 8/2013 | Pratt et al. |
| 8,601,102 B1 | 12/2013 | Lee et al. |
| 8,611,928 B1 | 12/2013 | Bill |
| 8,687,536 B2 | 4/2014 | Michaelis |
| 8,689,281 B2 | 4/2014 | Balinsky et al. |
| 8,769,605 B2 | 7/2014 | Kaufmann et al. |
| 8,843,413 B2 | 9/2014 | Robert et al. |
| 8,875,222 B1 | 10/2014 | Chang et al. |
| 8,933,778 B2 | 1/2015 | Birkel et al. |
| 8,934,841 B2 | 1/2015 | Koh et al. |
| 8,955,038 B2 | 2/2015 | Nicodemus et al. |
| 9,143,530 B2 * | 9/2015 | Qureshi ............... H04L 9/0891 |
| 9,167,031 B2 | 10/2015 | Takashima |
| 9,247,014 B1 | 1/2016 | Rao |
| 9,516,066 B2 | 12/2016 | Brannon et al. |
| 9,680,763 B2 | 6/2017 | Marshall et al. |
| 9,705,813 B2 | 7/2017 | Marshall et al. |
| 2001/0047335 A1 | 11/2001 | Arndt et al. |
| 2002/0013721 A1 | 1/2002 | Dabbiere et al. |
| 2002/0049580 A1 | 4/2002 | Kutaragi et al. |
| 2002/0055967 A1 | 5/2002 | Coussement |
| 2002/0098840 A1 | 7/2002 | Hanson et al. |
| 2002/0157019 A1 | 10/2002 | Kadyk et al. |
| 2003/0020623 A1 | 1/2003 | Cao et al. |
| 2003/0065934 A1 | 4/2003 | Angelo et al. |
| 2003/0065950 A1 | 4/2003 | Yarborough |
| 2003/0110084 A1 | 6/2003 | Eberhard et al. |
| 2003/0164853 A1 | 9/2003 | Zhu et al. |
| 2003/0172166 A1 | 9/2003 | Judge et al. |
| 2003/0186689 A1 | 10/2003 | Herle et al. |
| 2003/0204716 A1 | 10/2003 | Rockwood et al. |
| 2003/0232616 A1 * | 12/2003 | Gidron et al. |
| 2004/0003133 A1 | 1/2004 | Pradhan et al. |
| 2004/0008113 A1 | 1/2004 | Pradhan et al. |
| 2004/0019626 A1 | 1/2004 | Shepherd et al. |
| 2004/0064713 A1 * | 4/2004 | Yadav ................ G06F 21/606 713/193 |
| 2004/0098715 A1 | 5/2004 | Aghera et al. |
| 2004/0123153 A1 | 6/2004 | Wright et al. |
| 2004/0167984 A1 * | 8/2004 | Herrmann ............... H04L 63/08 709/229 |
| 2004/0181687 A1 | 9/2004 | Nachenberg et al. |
| 2004/0224703 A1 | 11/2004 | Takaki et al. |
| 2004/0243428 A1 | 12/2004 | Black et al. |
| 2005/0003804 A1 | 1/2005 | Huomo et al. |
| 2005/0005113 A1 | 1/2005 | Dillon et al. |
| 2005/0071748 A1 | 3/2005 | Shipp |
| 2005/0097032 A1 | 5/2005 | Benco et al. |
| 2005/0097327 A1 | 5/2005 | Ondet et al. |
| 2005/0181808 A1 | 8/2005 | Vaudreuil |
| 2005/0198029 A1 | 9/2005 | Pohja et al. |
| 2005/0246192 A1 | 11/2005 | Jauffred et al. |
| 2005/0272445 A1 | 12/2005 | Zellner |
| 2005/0283614 A1 | 12/2005 | Hardt |
| 2006/0013566 A1 | 1/2006 | Nakamura |
| 2006/0059100 A1 | 3/2006 | Ronning et al. |
| 2006/0067250 A1 | 3/2006 | Boyer et al. |
| 2006/0130139 A1 | 6/2006 | Sobel et al. |
| 2006/0149846 A1 | 7/2006 | Schuba |
| 2006/0190984 A1 | 8/2006 | Heard et al. |
| 2006/0234793 A1 | 10/2006 | Walker et al. |
| 2006/0253474 A1 | 11/2006 | Hotchkiss et al. |
| 2007/0033397 A1 | 2/2007 | Phillips et al. |
| 2007/0053306 A1 | 3/2007 | Stevens |
| 2007/0093243 A1 | 4/2007 | Kapadekar et al. |
| 2007/0130473 A1 | 6/2007 | Mazotas |
| 2007/0136492 A1 | 6/2007 | Blum et al. |
| 2007/0136579 A1 | 6/2007 | Levy et al. |
| 2007/0143603 A1 | 6/2007 | Hadden et al. |
| 2007/0156897 A1 | 7/2007 | Lim |
| 2007/0157288 A1 * | 7/2007 | Lim ..................... H04L 63/105 726/1 |
| 2007/0162417 A1 | 7/2007 | Cozianu et al. |
| 2007/0174433 A1 | 7/2007 | Mendez et al. |
| 2007/0189303 A1 * | 8/2007 | Sunada ................ H04L 63/102 370/395.5 |
| 2007/0192484 A1 | 8/2007 | Yamaoka et al. |
| 2007/0192588 A1 | 8/2007 | Roskind et al. |
| 2007/0260883 A1 | 11/2007 | Giobbi et al. |
| 2007/0261099 A1 | 11/2007 | Broussard et al. |
| 2007/0288637 A1 | 12/2007 | Layton et al. |
| 2007/0300070 A1 | 12/2007 | Shen-Orr et al. |
| 2008/0010689 A1 | 1/2008 | Ooi et al. |
| 2008/0014947 A1 | 1/2008 | Carnall |
| 2008/0065727 A1 | 3/2008 | Majors et al. |
| 2008/0070593 A1 | 3/2008 | Altman et al. |
| 2008/0072276 A1 | 3/2008 | Pouliot |
| 2008/0125102 A1 | 5/2008 | Abel et al. |
| 2008/0133712 A1 | 6/2008 | Friedman et al. |
| 2008/0134296 A1 | 6/2008 | Amitai et al. |
| 2008/0134305 A1 | 6/2008 | Hinton et al. |
| 2008/0134347 A1 | 6/2008 | Goyal et al. |
| 2008/0160984 A1 | 7/2008 | Benes et al. |
| 2008/0168030 A1 * | 7/2008 | Songer ................... H04W 48/18 |
| 2008/0201453 A1 | 8/2008 | Assenmacher |
| 2008/0228504 A1 | 9/2008 | Nguyen et al. |
| 2008/0268895 A1 | 10/2008 | Foxenland |
| 2008/0291897 A1 | 11/2008 | Sourani |
| 2008/0301057 A1 | 12/2008 | Oren |
| 2008/0307219 A1 | 12/2008 | Karandikar |
| 2008/0318548 A1 | 12/2008 | Bravo et al. |
| 2009/0036111 A1 | 2/2009 | Danford et al. |
| 2009/0049157 A1 | 2/2009 | Kimura et al. |
| 2009/0061890 A1 | 3/2009 | Andreasson et al. |
| 2009/0063683 A1 * | 3/2009 | Palin ..................... G06F 9/544 709/226 |
| 2009/0080650 A1 | 3/2009 | Selgas et al. |
| 2009/0086964 A1 | 4/2009 | Agrawal et al. |
| 2009/0089565 A1 | 4/2009 | Buchanan et al. |
| 2009/0138937 A1 | 5/2009 | Erlingsson et al. |
| 2009/0144632 A1 | 6/2009 | Mendez |
| 2009/0186633 A1 | 7/2009 | Yonker et al. |
| 2009/0198997 A1 | 8/2009 | Yeap et al. |
| 2009/0203375 A1 | 8/2009 | Gisby et al. |
| 2009/0222880 A1 | 9/2009 | Mayer et al. |
| 2009/0249440 A1 | 10/2009 | Platt et al. |
| 2009/0260064 A1 | 10/2009 | McDowell et al. |
| 2009/0287921 A1 | 11/2009 | Zhu et al. |
| 2009/0298514 A1 | 12/2009 | Ullah |
| 2009/0300739 A1 | 12/2009 | Nice et al. |
| 2009/0307362 A1 | 12/2009 | Mendez et al. |
| 2009/0327908 A1 * | 12/2009 | Hayton ............... G06F 21/6218 715/744 |
| 2010/0005125 A1 | 1/2010 | Mendez et al. |
| 2010/0005157 A1 | 1/2010 | Mendez et al. |
| 2010/0005159 A1 | 1/2010 | Ishiguro |
| 2010/0005195 A1 | 1/2010 | Mendez et al. |
| 2010/0023630 A1 | 1/2010 | Mendez et al. |
| 2010/0064354 A1 | 3/2010 | Irvine |
| 2010/0083359 A1 | 4/2010 | Readshaw et al. |
| 2010/0087144 A1 | 4/2010 | Korenshtein |
| 2010/0091711 A1 | 4/2010 | Sawai |
| 2010/0094981 A1 | 4/2010 | Cordray et al. |
| 2010/0100641 A1 | 4/2010 | Quinlan et al. |
| 2010/0100972 A1 | 4/2010 | Lemieux et al. |
| 2010/0107238 A1 | 4/2010 | Stedman et al. |
| 2010/0120450 A1 | 5/2010 | Herz |

(56) References Cited

U.S. PATENT DOCUMENTS

| | | |
|---|---|---|
| 2010/0131527 A1 | 5/2010 | Wohlert |
| 2010/0131844 A1 | 5/2010 | Wohlert |
| 2010/0138667 A1 | 6/2010 | Adams et al. |
| 2010/0144323 A1 | 6/2010 | Collins et al. |
| 2010/0146269 A1 | 6/2010 | Baskaran |
| 2010/0150342 A1 | 6/2010 | Richards et al. |
| 2010/0191837 A1 | 7/2010 | Linden et al. |
| 2010/0205657 A1 | 8/2010 | Manring et al. |
| 2010/0212016 A1 | 8/2010 | Dubhashi et al. |
| 2010/0222645 A1 | 9/2010 | Nadler et al. |
| 2010/0254410 A1 | 10/2010 | Collins |
| 2010/0257421 A1 | 10/2010 | Kohno et al. |
| 2010/0262828 A1 | 10/2010 | Brown et al. |
| 2010/0262829 A1 | 10/2010 | Brown et al. |
| 2010/0268844 A1 | 10/2010 | Quinlan et al. |
| 2010/0273456 A1 | 10/2010 | Wolovitz et al. |
| 2010/0274910 A1 | 10/2010 | Ghanaie-Sichanie et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2010/0317371 A1 | 12/2010 | Westerinen et al. |
| 2010/0318701 A1 | 12/2010 | Srinivansan et al. |
| 2010/0325710 A1 | 12/2010 | Etchegoyen |
| 2011/0004941 A1 | 1/2011 | Mendez et al. |
| 2011/0039506 A1 | 2/2011 | Lindahl et al. |
| 2011/0055891 A1 | 3/2011 | Rice |
| 2011/0082900 A1 | 4/2011 | Nagpal et al. |
| 2011/0113062 A1 | 5/2011 | Quinlan et al. |
| 2011/0113094 A1 | 5/2011 | Rathod |
| 2011/0135083 A1 | 6/2011 | Lingafelt et al. |
| 2011/0136510 A1 | 6/2011 | Peterson et al. |
| 2011/0141276 A1 | 6/2011 | Borghei |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0165861 A1 | 7/2011 | Wilson et al. |
| 2011/0167474 A1 | 7/2011 | Sinha et al. |
| 2011/0202589 A1 | 8/2011 | Piernot et al. |
| 2011/0202987 A1 | 8/2011 | Bauer-Hermann et al. |
| 2011/0225252 A1 | 9/2011 | Bhat et al. |
| 2011/0270799 A1 | 11/2011 | Muratov |
| 2011/0271113 A1 | 11/2011 | Venters et al. |
| 2011/0276805 A1 | 11/2011 | Nagpal et al. |
| 2011/0277013 A1 | 11/2011 | Chinta |
| 2011/0296186 A1 | 12/2011 | Wong et al. |
| 2011/0320552 A1 | 12/2011 | Friedman et al. |
| 2011/0320819 A1 | 12/2011 | Weber et al. |
| 2012/0005578 A1 | 1/2012 | Hawkins |
| 2012/0011007 A1 | 1/2012 | Blewett et al. |
| 2012/0015644 A1 | 1/2012 | Danford et al. |
| 2012/0054385 A1 | 3/2012 | Lim et al. |
| 2012/0094639 A1 | 4/2012 | Carlson et al. |
| 2012/0102392 A1 | 4/2012 | Reesman et al. |
| 2012/0110345 A1 | 5/2012 | Pigeon et al. |
| 2012/0117209 A1 | 5/2012 | Sinha |
| 2012/0124640 A1* | 5/2012 | Bender ............ G06F 21/6218 726/1 |
| 2012/0150577 A1 | 6/2012 | Berg et al. |
| 2012/0190386 A1 | 7/2012 | Anderson |
| 2012/0198547 A1 | 8/2012 | Fredette et al. |
| 2012/0204032 A1 | 8/2012 | Wilkins et al. |
| 2012/0246719 A1 | 9/2012 | Bhamidipaty et al. |
| 2012/0252494 A1 | 10/2012 | Parker et al. |
| 2012/0272287 A1 | 10/2012 | Kuhlke et al. |
| 2012/0284322 A1 | 11/2012 | Aborczfalvi et al. |
| 2012/0288091 A1 | 11/2012 | Honke et al. |
| 2012/0289153 A1 | 11/2012 | Dobyns |
| 2012/0290544 A1 | 11/2012 | Abuelsaad et al. |
| 2012/0291104 A1 | 11/2012 | Hasek |
| 2012/0311329 A1 | 12/2012 | Medina et al. |
| 2012/0311686 A1 | 12/2012 | Medina et al. |
| 2012/0331527 A1 | 12/2012 | Walters et al. |
| 2013/0007245 A1 | 1/2013 | Malik et al. |
| 2013/0036459 A1 | 2/2013 | Liberman et al. |
| 2013/0040604 A1 | 2/2013 | Sprigg et al. |
| 2013/0040629 A1 | 2/2013 | Sprigg et al. |
| 2013/0045729 A1 | 2/2013 | Haik et al. |
| 2013/0046971 A1 | 2/2013 | Lu |
| 2013/0055363 A1 | 2/2013 | Dattagupta et al. |
| 2013/0060857 A1* | 3/2013 | Bezos ............... H04L 12/66 709/204 |
| 2013/0061307 A1 | 3/2013 | Livne |
| 2013/0067121 A1* | 3/2013 | Beel ............... H04M 7/0027 710/20 |
| 2013/0081101 A1 | 3/2013 | Baer et al. |
| 2013/0086466 A1 | 4/2013 | Levy et al. |
| 2013/0091550 A1* | 4/2013 | Joyce ............... G06F 21/00 726/4 |
| 2013/0132854 A1 | 5/2013 | Raleigh et al. |
| 2013/0152169 A1 | 6/2013 | Stuntebeck |
| 2013/0165232 A1 | 6/2013 | Nelson et al. |
| 2013/0174223 A1 | 7/2013 | Dykeman et al. |
| 2013/0226696 A1 | 8/2013 | Cook |
| 2013/0229930 A1 | 9/2013 | Akay et al. |
| 2013/0244614 A1 | 9/2013 | Santamaria et al. |
| 2013/0254401 A1 | 9/2013 | Marshall et al. |
| 2013/0275038 A1 | 10/2013 | Hania et al. |
| 2013/0283370 A1 | 10/2013 | Vipat et al. |
| 2013/0285855 A1 | 10/2013 | Dupray et al. |
| 2013/0304893 A1 | 11/2013 | Aggarwal et al. |
| 2013/0347053 A1* | 12/2013 | Motoyama ........ G06F 21/6218 726/1 |
| 2014/0006347 A1* | 1/2014 | Qureshi .............. G06F 21/10 707/621 |
| 2014/0007182 A1 | 1/2014 | Qureshi et al. |
| 2014/0013420 A1 | 1/2014 | Piccionelli et al. |
| 2014/0025256 A1 | 1/2014 | Armitage et al. |
| 2014/0053229 A1* | 2/2014 | Saib ................ G06F 21/00 726/1 |
| 2014/0053250 A1* | 2/2014 | Wethington et al. ... H04L 29/06 726/5 |
| 2014/0066098 A1 | 3/2014 | Stern et al. |
| 2014/0068717 A1 | 3/2014 | Mayes et al. |
| 2014/0073244 A1 | 3/2014 | Ko et al. |
| 2014/0082501 A1 | 3/2014 | Bae et al. |
| 2014/0084067 A1 | 3/2014 | Vanderhulst |
| 2014/0096180 A1 | 4/2014 | Negi et al. |
| 2014/0096212 A1 | 4/2014 | Smith et al. |
| 2014/0113556 A1 | 4/2014 | Kotecha |
| 2014/0123224 A1 | 5/2014 | Nosrati |
| 2014/0143852 A1 | 5/2014 | Cottrell et al. |
| 2014/0162688 A1 | 6/2014 | Edge |
| 2014/0171060 A1 | 6/2014 | Cook et al. |
| 2014/0177495 A1 | 6/2014 | Mallikarjunan et al. |
| 2014/0198024 A1 | 7/2014 | Adzhigirey et al. |
| 2014/0213179 A1 | 7/2014 | Rosenberg |
| 2014/0214668 A1 | 7/2014 | Lotter et al. |
| 2014/0215212 A1 | 7/2014 | Dempster et al. |
| 2014/0222504 A1 | 8/2014 | MacKenzie et al. |
| 2014/0223177 A1 | 8/2014 | Dempster et al. |
| 2014/0230038 A1 | 8/2014 | Leong et al. |
| 2014/0237235 A1 | 8/2014 | Kuno et al. |
| 2014/0237614 A1 | 8/2014 | Irvine |
| 2014/0258481 A1 | 9/2014 | Lundell |
| 2014/0282877 A1 | 9/2014 | Mahaffey et al. |
| 2014/0287688 A1 | 9/2014 | Dempster et al. |
| 2014/0310771 A1 | 10/2014 | Marshall et al. |
| 2015/0156205 A1* | 6/2015 | Yin ................ G06F 21/577 726/1 |
| 2015/0163336 A1 | 6/2015 | Ramos et al. |
| 2015/0207795 A1 | 7/2015 | Wentz et al. |
| 2017/0269955 A1 | 9/2017 | Hardy |

FOREIGN PATENT DOCUMENTS

| | | |
|---|---|---|
| GB | 2309860 | 5/2000 |
| GB | 2346716 | 8/2000 |
| GB | 2361558 | 10/2001 |
| JP | H07141245 | 6/1995 |
| JP | H08251660 | 9/1996 |
| JP | 2007304009 | 11/2007 |
| JP | 2011234084 | 11/2011 |

(56) References Cited

FOREIGN PATENT DOCUMENTS

| WO | 9600485 | 1/1996 |
| WO | 9704389 | 2/1997 |
| WO | 9922322 | 5/1999 |
| WO | 0003316 | 1/2000 |
| WO | 02141661 | 5/2002 |
| WO | 2010052669 | 5/2010 |
| WO | 2011022053 | 2/2011 |
| WO | 2012098596 | 7/2012 |
| WO | 2013011512 | 1/2013 |
| WO | 2013109040 | 7/2013 |

OTHER PUBLICATIONS

Mobile Application Management, Meeting the BYOD challenge with next-generation application and device management, Kony, Jul. 2012, pp. 1-16 (Year: 2012).*

How to Keep Your Personal Information Secured, Federal Trade Commission, Jul. 2012, pp. 1-4 (Year: 2012).*

The Dark Side of BYOD—Privacy, Personal Data Loss and Device Seizure, Trend Micro, Jan. 31, 2012, pp. 1-3 (Year: 2012).*

Office Action dated Mar. 13, 2017 for U.S. Appl. No. 15/341,600.

Anonymous: "can you download free apps without apple id / Officeial Apple Support Communities (1st question and answer)", May 5, 2012 (May 5, 2012), XP055335582, Retrieved from the Internet: URL https://discussions.apple.com/thread/3928236?start=0&tstart=0.

Asynchrony Software, Inc., "PDA Defense User Guide", 726, 2002.

Belani, Eshwar et al., "The CRISIS Wide Area Security Architecture", 726, 1998.

Benaloh, Josh et al., "Patient Controlled Encryption: Ensuring Privicy of Electronic Medical Records", 726, Nov. 13, 2009.

Fox, Armando et al., "Security on the Move: Indirect Authentication Using Kerberos", 726, 1996.

Gong, Li; et al. "Multicast Security and Its Extension to Mobile Environment", Oct. 1995.

Infinite Technologies, "Infinite Interchange", 1997.

Kiiskinen, Jani; et al. "Data Channel Service for Wireless Telephone Links" Jan. 1996.

Latedroid, "JuiceDefender" Jan. 15, 2012.

Menaria, Pankaj et al., "Security in Mobile Database Systems", 707, 726, Mar. 17, 2011.

Nokia, "Nokia 9000i Owner's Manual" 1997.

Pfitzmann, Andreas et al., "Mobile User Devices and Security Modules: Design for Trustworthiness", 726 Feb. 5, 96.

Ratner, David H. "Roam: A scalable Replication System for Mobile and Distributed Computing", Jan. 1998.

Ratner, David; et al. "Replication Requirements in Mobile Environments" Nov. 2001.

Research in Motion, "Blackberry Wireless Handheld 5810 Getting Started Guide" Jan. 15, 2003.

Research in Motion, "Blackberry Wireless Handheld 5810 Quick Reference Guide" 2003.

Research in Motion, "Blackberry Wireless Handheld 5810 User Guide" 2003.

Stajano, Frank; et al. "The Thinnest of Clients: Controlling It All Via Cellphone" Mobile Computing and Communications Review, vol. 2, No. 4, Oct. 1998.

Steiner, Jennifer, "Kerberos: An Authentication Service for Open Network Systems", 726, Jan. 12, 1988.

Strunk, John et al., "Self-Securting Storage: Protecting Data in Compromised Systems", Symposium On Operating Systems Design and Implementation, 726, 2000.

Sybase, "MobiLink Synchronization User's Guide", Part No. 38132-01-0800-01, Nov. 2001.

Symantec Corporation, "Creating Norton pcAnywhere Scripts" 1994.

Traveling Software, Inc., "LapLink for Windows 95" 1996.

Wachowicz, Moniza; et al. "Combining Location and Data Management in an Environment for Total Mobility" In Proceedings for the International Workshop on Information Visualization an Mobile Computing, 1996.

Xcellenet, Inc., "RemoteWare Client for Windows NT and Windows 95 User's Guides" 1996.

Xcellenet, Inc., "RemoteWare Forms and RemoteWare Query" 1994.

Xcellenet, Inc., "RemoteWare Forms Getting Started Guide" 1994.

Xcellenet, Inc., "RemoteWare Server for Windows NT" 1996.

Xcellenet, Inc., "RemoteWare Server Operations Guide" 1992.

* cited by examiner

CONTROLLING ELECTRONICALLY COMMUNICATED RESOURCES

CROSS-REFERENCE TO RELATED APPLICATION

This application is a continuation of and claims the benefit of U.S. patent application Ser. No. 13/828,922, entitled "CONTROLLING ELECTRONICALLY COMMUNICATED RESOURCES," filed Mar. 14, 2013, which is hereby incorporated by reference herein in its entirety.

BACKGROUND

Electronic content provided via a network, such as documents or applications, may be used to enhance collaborative projects between multiple users or to provide electronic content to a widespread audience. For example, video content and other multimedia presentations can be used to provide instructions, augment lectures, and otherwise enhance projects involving multiple participants. Controlling access to and distribution of electronic content and other enterprise resources in a networked environment may ensure that only authorized users and network-connected devices may gain access to sensitive information.

Systems and methods are desirable for temporarily controlling independently operated computing devices to provide electronic content to users of the computing devices.

SUMMARY

Systems, devices, and methods for controlling resources that are electronically communicated among computing devices are described.

In some embodiments, a management application identifies multiple entities for communicating electronic content. The management application determines that at least a subset of entities required for communicating the electronic content is available for electronic communication. The management application authorizes communication of at least some of the electronic content among the entities in response to determining that the required subset of entities is available for electronic communication.

In some embodiments, a management application prevents unauthorized access to an electronic meeting. The management application identifies multiple entities authorized for electronic communication among one another. The management application detects an additional entity that lacks an authorization for electronic communication among the entities. The management application restricts a communication of at least some electronic content among at least some of the entities based on detecting the additional entity that lacks the authorization.

In some embodiments, a system is provided. The system identifies multiple entities required for authorizing at least one of multiple communication features for communicating electronic content. At least one additional communication feature is available in an absence of at least one of the required entities. The system determines that each required entity is available for electronic communication. The system authorizes performance of the at least one communication feature based on determining that each entity is available for electronic communication.

These illustrative aspects and embodiments are mentioned not for purposes of limitation or definition, but to provide examples to aid understanding of the concepts described and disclosed herein. Other aspects, advantages, and features will become apparent after review of the entire disclosure, including the accompanying figures and claims.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

Figure 1:
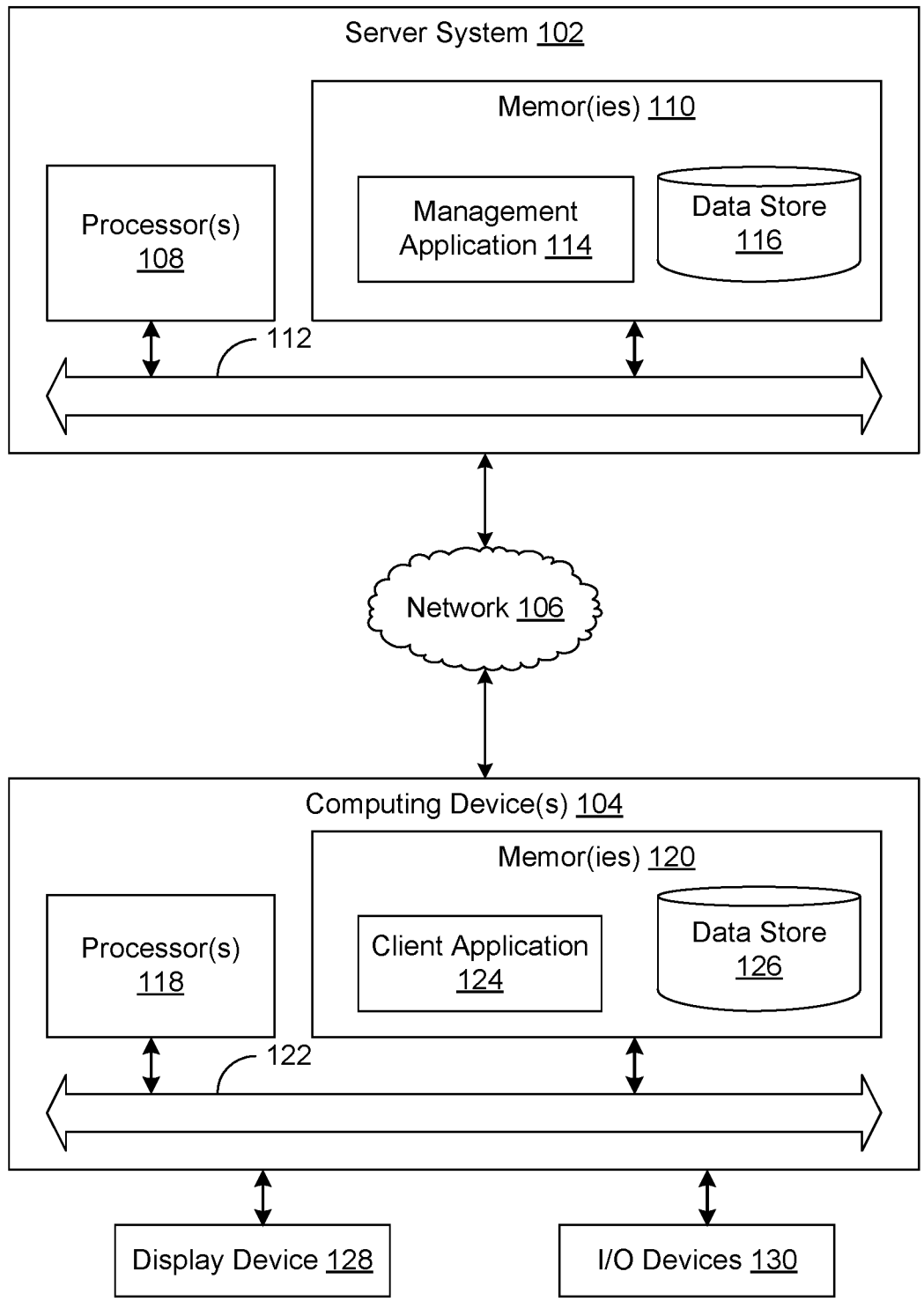
FIG. 1 is a block diagram of a networked environment according to some embodiments.

Computer-implemented systems and methods are disclosed for a management application controlling applications, files, and other resources being accessed, executed, and/or otherwise used at computing devices via an electronic meeting and/or other forum for electronic communication.

The following non-limiting example is provided to help introduce the general subject matter of certain embodiments. Multiple individuals may participate in a board meeting for an organization. The board meeting may be scheduled for a given conference room within a building during a given time period. Individuals may participate in the board meeting in person or remotely. Individuals participating in the board meeting may use mobile computing devices, such as tablet computers and/or smart phones, to access board related documents that may be needed for the meeting. The board related documents may be shared to the mobile computing devices via an electronic meeting session. It may be desirable to prevent sharing of the board related documents until a quorum of board members and/or specific members of the board, such as an executive committee, join the meeting, either in person or remotely. A management application can determine the number of the board members and/or the specific board members present in the meeting room and/or accessing the electronic meeting for sharing the board related documents. The management application can determine that a quorum is available and/or the specific members of the board are present based on those members accessing the electronic meeting. The management application can authorize the sharing of the board related documents via the electronic conference based on the quorum being available and/or the specific members of the board being present, thereby ensuring that no less than the required meeting participants are available at a certain time and place to receive the content. The management application can also detect the either the physical presence of unauthorized computing devices and/or attempts to access the electronic meeting by unauthorized users (e.g., non-board members). The management application can restrict sharing of the board related documents via the electronic meeting to prevent the unauthorized computing devices and/or unauthorized users from obtaining the documents via the electronic meeting.

In accordance with some embodiments, a management application can control the use of resources by computing devices via an electronic meeting and/or other forms of electronic communication. The management application can identify multiple entities required for communicating electronic content. An entity can include a logical representation of any participant in a meeting. The management application may identify a given entity based on any suitable criteria. Non-limiting examples of suitable criteria include (but are not limited to) credentials associated with a particular user (such as, but not limited to, a user name and/or other identifier), one or more identifiers associated with a computing device used to access the electronic meeting (such as, but not limited to, a hardware identifier or network address of the computing device), and/or based on a pairing of a user credential and a device identifier. The required entities may be a subset of all entities authorized to access the electronic meeting. In the absence of all of the required entities, communication of electronic content via the electronic meeting may be restricted and/or disallowed. The management application can determine that each required entity is physically present in the meeting room (assuming an in-person meeting is being held) and/or accessing the electronic meeting (either from within the meeting room and/or a remote location). The management application can authorize communication of the electronic content among the required entities and other authorized entities via the electronic meeting based on determining that each required entity is present in the meeting room and/or accessing the electronic meeting. It should be understood that in some cases, the management application can authorize communication of the electronic content among the required entities and other authorized users even if one of the required users is not accessing the electronic meeting, as long as that required user is physically present in the meeting room.

As used herein, the term "electronic meeting" is used to refer to an exchange of information between at least two entities executed via a telecommunication system. An electronic meeting may include at least one entity, such as (but not limited to) moderator entities, that are authorized to perform at least one function during the electronic meeting that are unavailable to other entities accessing the meeting. An electronic meeting may permit the exchange of electronic content, such as documents, multimedia presentations, text messages, and the like. In some embodiments, at least one restriction can be placed on the exchange of electronic content during the meeting. Non-limiting examples of an electronic meeting include telephone conferences, internet telephone conferences, videoconferences, web conferences, and the like.

As used herein, the term "electronic content" is used to refer to any type of resources that can accessed, be rendered for display, and/or otherwise used at a computing system and/or other electronic device. Electronic content can include text and/or multimedia files, such as images, video, audio, and/or any combination thereof. Electronic content can also include application software that is designed to perform at least one specific task at a computing system.

In some embodiments, each entity can correspond to and/or otherwise be associated with a respective computing device. The management application can determine whether each computing device corresponding to a required entity is authorized to access the electronic meeting. Determining that each computing device is authorized to access the electronic meeting can include determining that the computing device is compliant with at least one rule that controls access to the electronic content by computing devices. For example, a rule may require that software such as a mobile device management module and/or up-to-date antivirus software be installed on the computing device as a prerequisite to granting access to resources shared via the electronic meeting.

In some embodiments, determining that each entity is authorized for accessing the electronic meeting may include determining that at least some of the computing devices corresponding to the required entities are positioned in a specific geographical location. For example, the management application may require that wireless devices corresponding to required entities be positioned in a particular conference room of an office building and/or that the wireless devices be positioned within a given proximity to one another and/or a given distance from non-authorized wireless devices. The management application can determine that the computing devices are positioned in a specific geographical location by communicating with a computing device and/or system configured for detecting the computing devices, such as (but not limited to) a sensor system, a global positioning system, a telecommunication system, etc. In some cases, the management application may be able to determine locations of the computing devices by communicating with the computing devices themselves (e.g., but requiring the computing devices to transmit its geospatial coordinates and/or other positioning information to the management application).

In some embodiments, the management application may restrict communication of electronic content based on at least one triggering condition. The triggering conditions may include a required entity leaving a meeting, a computing device corresponding to a required entity leaving a common geographical location, an unauthorized entity accessing and/or attempting to access the electronic meeting, and/or an unauthorized computing device being positioned within a given proximity to one and/or more of the computing devices corresponding to authorized entities. In some embodiments, restricting the communication of electronic content can include restricting the participating entities to communication of a subset of electronic content. For example, an electronic meeting that involves sharing both publicly available documents and secret and/or otherwise sensitive documents may be restricted to sharing only the publicly available documents in the absence of all required entities and/or upon detecting the presence of an unauthorized entity. The presence of an unauthorized entity can include, for example, the unauthorized entity accessing and/or attempting to access the electronic meeting and/or a computing device corresponding to the unauthorized entity being positioned in proximity to computing devices corresponding to authorized entities. In some embodiments, restricting the communication of electronic content can include barring any communication of electronic content in the absence of all required entities and/or the presence of an unauthorized entity.

In some embodiments, the management application may authenticate each entity accessing the electronic meeting based on authentication data provided by a client application executed at a computing device corresponding to the entity. As used herein, the term "authentication data" is used to refer to any data used by an application to verify the identity of an entity and/or approve access to a resource provided via the application. In some embodiments, authentication data can include information provided by the entity. Non-limiting examples of authentication data provided by an entity include a password, a personal identification number, at least one answer to at least one secret question, a token, and the like. In some embodiments, authentication data can include biometric information associated with the entity. Non-limiting examples of biometric information associated with the entity can include the entity's voice, DNA, handprint, iris and/or retinal scan, and the like.

In some embodiments, the management application can authorize communication of the electronic content based on secondary authentication data generated from authentication data provided by each of the required entities. In some embodiments, generating secondary authentication data can include combining the authentication data received from the required entities. For example, the management application may concatenate and/or otherwise join a group of passwords received from the required entities to form a combined password. The combined password may be used to verify that the communication of electronic content during the electronic meeting is authorized. In some embodiments, generating secondary authentication data from authentication data provided by required entities can include generating authentication data that is different from the separate authentication data received from the required entities. For example, the management application may receive a personal identification number from each of the required entities. The management application can perform at least one mathematical operation and/or other algorithms on the received personal identification numbers. The output of the mathematical operation(s) and/or other algorithm can be a new identification number. The new identification number may be used to verify that the electronic content can be communicated during the electronic meeting.

In some embodiments, the management application can authorize communication of electronic content by decrypting the electronic content with an encryption key collectively provided by the required entities. The management application can receive a respective portion of the encryption key from each required entity and/or from a computing device corresponding to the required entity. The management application can combine the portions to obtain the encryption key. The management application can decrypt the electronic content with the encryption key.

In some embodiments, the management application can restrict communication of electronic content via an electronic meeting in response to detecting an unauthorized entity. In some embodiments, detecting the unauthorized entity can include determining that a computing device corresponding to the unauthorized entity (e.g., a user that is not authorized to access the meeting) is positioned in the same geographical location as other computing devices authorized to access the meeting. In some embodiments, the management application can determine that a computing device is not authorized to access the electronic meeting, regardless of whether the operator of the computing device is authorized to access the meeting. For example, the management application can determine that a computing device is not authorized to access the electronic meeting based on the computing device being non-compliant with at least one rule governing access to the electronic content by computing devices.

In some embodiments, the management application can perform at least one remedial action in response to detecting an unauthorized computing device accessing an electronic meeting, attempting to access the electronic meeting, and/or being positioned in the vicinity of other computing devices authorized to access the electronic meeting. In one non-limiting example, the remedial action includes transmitting a software update to the computing device. The software update is configured to bring the computing device into compliance with at least one rule governing access to resources shared via the electronic meeting. In another non-limiting example, the remedial action includes transmitting a command to a client application executing on the computing device. The command directs the client application to erase some or all content and/or applications from the computing device (i.e., perform a partial or total "device wipe") and/or to disable certain functions of the computing device and/or its applications. In another non-limiting example, the remedial action includes transmitting a command directing the client application to lock the computing device.

In some embodiments, the management application can detect the unauthorized entity based on the unauthorized entity unsuccessfully attempting to access the electronic meeting. In one non-limiting example, the management application can determine that authentication data provided by the entity is invalid. The management application may execute at least one remedial action in response to a threshold number of failed attempts by an entity to access the meeting using invalid authentication data. In another non-limiting example, the management application can determine that the entity is not included on a listing of the entities authorized to access the electronic meeting. In another non-limiting example, the management application can determine that a request from the entity to access the electronic meeting has a timestamp outside a designated time period for the electronic meeting.

The foregoing illustrative examples are given to introduce the general subject matter discussed herein and are not intended to limit the scope of the disclosed concepts. The following sections describe various additional aspects and examples with reference to the drawings in which like numerals indicate like elements. The features discussed herein are not limited to any particular hardware architecture and/or configuration. A computing device can include any suitable arrangement of components that provide a result conditioned on at least one input. Suitable computing devices include multipurpose microprocessor-based computer systems accessing stored software that programs and/or configures the computing system from a general-purpose computing apparatus to a specialized computing apparatus implementing one or more aspects of the present subject matter. Any suitable programming, scripting, and/or other type of language and/or combinations of languages may be used to implement the teachings contained herein in software to be used in programming and/or configuring a computing device. Aspects and features from each embodiment disclosed can be combined with any other embodiment.

Example System Implementation

Referring now to the drawings, FIG. 1 is a block diagram depicting example computing systems for implementing certain embodiments. The example computing systems include a server system 102 and at least one example computing device 104 in communication via a network 106. A general discussion of the components of the server system 102 and the computing device 104 is provided below.

The server system 102 may include at least one server computer and/or any other system providing capabilities for managing access to resources and/or distributing resources to computing device(s) 104. In some embodiments, multiple server systems 102 may be employed that are configured in at least one server bank, computer banks, and/or other arrangements. For example, multiple server systems 102 may be configured to provide a cloud computing resource, a grid computing resource, and/or any other distributed computing arrangement. Such server systems 102 may be located in a single installation or may be distributed among many different geographic locations. For purposes of convenience, the server system 102 is referred to herein in the singular. Even though the server system 102 is referred to in the singular, it is understood that multiple server systems 102 may be employed in the arrangements as descried herein.

The computing device 104 can include any suitable computing device and/or system for communicating via the network 106 and executing at least one application. Non-limiting examples of a computing device 104 include a desktop computer, a laptop computer, a personal digital assistant, a cellular telephone, a set-top box, a music player, a web pad, a tablet computer system, a game console, and/or another device with like capability. The computing device 104 may be configured to execute various applications. For example, the computing device 104 may be configured to execute applications such as web browsing applications, email applications, instant messaging applications, and/or other applications capable of receiving and/or rendering resources 202 on a display 136 associated with the computing device 104.

The server system 102 includes a processor 108 and the computing device 104 includes a processor 118. Each of the processors 108, 118 may be a microprocessor, an application-specific integrated circuit ("ASIC"), a state machine, and/or other suitable processing device. The processors 108, 118 may be of electrical and/or of some other available construction. Each of the processors 108, 118 can include any number of computer processing devices, including one. Each of the processors 108, 118 can be communicatively coupled to a computer-readable medium, such as the memories 110, 120, respectively. Each of the processors 108, 118 can execute computer-executable program instructions and/or accesses information respectively stored in the memory 110 of the server system 102 and in the memory 120 of the computing device 104.

Each of the memories 110, 120 can include a computer-readable medium and/or other memory device. A computer-readable medium and/or other memory device can include both volatile and nonvolatile memory and data storage components. Volatile components are those that do not retain data values upon loss of power. Nonvolatile components include memory components that retain data upon a loss of power. A computer-readable medium may include (but is not limited to) an electronic, optical, magnetic, and/or other storage device capable of providing a processor with computer-readable instructions. Other examples comprise, but are not limited to, floppy disks accessed via an associated floppy disk drive, magnetic disk, magnetic tape and/or other magnetic storage, memory chip, read-only memory ("ROM"), random access memory ("RAM"), an ASIC, a configured processor, optical storage accessed via an optical medium drive, solid-state drives, USB flash drives, memory cards accessed via a memory card reader, magnetic tapes accessed via an appropriate tape drive, and/or other memory components, and/or a combination of any two or more of these memory components. RAM may include, for example, static random access memory ("SRAM"), dynamic random access memory ("DRAM"), or magnetic random access memory ("MRAM") and other such devices. ROM may comprise, for example, a programmable read-only memory ("PROM"), an erasable programmable read-only memory ("EPROM"), an electrically erasable programmable read-only memory ("EEPROM"), or other like memory device.

The processor 108 and the memory 110 of the server system 102 may be communicatively coupled to a local interface 112. The processor 118 and the memory 120 of the computing device 104 may be communicatively coupled to a local interface 122. A local interface can include, for example, a data bus with an accompanying address/control bus or other bus structure. One or more of the processors 108, 118 may represent multiple processing devices and one or more of the memories 110, 120 may represent multiple memory devices that operate in parallel processing circuits, respectively. In such a case, one or more of the local interfaces 112, 122 may include an appropriate network that facilitates communication between any two of the multiple processors and/or between any two of the multiple memory devices. The local interfaces 112, 122 may comprise additional systems designed to coordinate this communication, including, for example, performing load balancing.

The computing device 104 may also include a number of external and/or internal devices such as a mouse, a keyboard, a display, audio speakers, one or more microphones, and/or any other input and/or output devices 130. For example, the computing device 104 may include and/or be in data communication with a display device 128. A non-limiting example of a display device 128 is a computer monitor or computer screen, such as a touch screen. Although FIG. 1 depicts the display device 128 as a separate device coupled to the computing device 104, the display device 128 can be integrated into the computing device 104.

The computing device 104 can also include at least one communication component (not shown in FIG. 1). One of the communication components can include a wired network connectivity component such as, for example, an Ethernet network adapter, a modem, and/or the like. The computing device 104 may further include a wireless network connectivity interface, for example, a Peripheral Component Interconnect ("PCI") card, a Universal Serial Bus ("USB") interface, a Personal Computer Memory Card International Association ("PCMCIA") card, Secure Digital Input-Output ("SDIO") card, NewCard, Cardbus, a modem, a wireless radio transceiver, and/or the like. The computing device 104 may be operable to communicate via wired connection with the server system 102 with the aid of the wired network connectivity component. The computing device 104 may be further operable to communicate wirelessly with the server system 102 with the aid of the wireless network connectivity component.

Instructions stored in the memory 110 of the server system 102 and executable by its processor 108 can include a management application 114 and/or other applications. The management application 114 can include at least one function for controlling resources executed at computing devices such as computing device 104, as described in detail below. Certain data may be stored in a data store 116 of the memory 110 that is part of and/or otherwise accessible to the server system 102. The illustrated data store 116 may be representative of a multiple data stores, as can be appreciated. The data stored in the data store 116, for example, is associated with the operation of certain applications and/or functional entities described herein. The data store 116 may utilize strong encryption standards to protect the resources 202 from unauthorized access. For example, the data store 116 may utilize Standard Hash Algorithm ("SHA-1") and/or a similar strong encryption standard that may be utilized for server-side data storage.

Instructions stored in the memory 120 of the computing device 104 and executable by its processor 118 can include a client application 124 and/or other applications. An application capable of receiving and/or rendering resources on a display device 128 is generally referred to herein as a "client application" 124. Certain data may be stored in a data store 126 of the memory 120 that is part of and/or otherwise accessible to the computing device 104. The illustrated data store 126 may be representative of multiple data stores. The data stored in the data store 126 may be associated with the operation of certain applications and/or functional entities described herein.

As used herein, the term "computer-executable program instructions" is used to refer to a program file that is in a form that can ultimately be run by a processor. Examples of computer-executable program instructions may be, for example, a compiled program that can be translated into machine code in a format that can be loaded into a random access portion of a memory and executed by a processor, source code that may be expressed in proper format such as object code that can be loaded into a random access portion of a memory and executed by a processor, source code that may be interpreted by another executable program to generate instructions in a random access portion of a memory and executed by a processor, and the like. The instructions may comprise processor-specific instructions generated by a compiler and/or an interpreter from code written in any suitable computer-programming language, including, for example, C, C++, C#, Visual Basic, Java, Python, Perl, JavaScript, and ActionScript. An executable program may be stored in any portion and/or component of a memory device such as, for example, RAM, ROM, a hard drive, solid-state drive, USB flash drive, memory card, optical disc such as compact disc ("CD") and/or digital versatile disc ("DVD"), floppy disk, magnetic tape, and/or other memory components.

The network 106 facilitates communication between a server system 102 and at least one computing device 104. The network 106 can include any suitable architecture for providing communication channels between the computing device 104 and the server system 102. A communication channel can include any suitable means capable of communicating signals between the computing device 104 and a server system 102. Non-limiting examples of the network 106 include any type of wired network, wireless network, and/or a combination of wired and wireless networks. A wireless network may be a wireless local area network ("WLAN"), a wireless wide area network ("WWAN"), and/or any other type of wireless network now known and/or later developed. Additionally, the network 106 may be and/or include the Internet, intranets, extranets, microwave networks, satellite communications, cellular systems, personal communication services ("PCS"), infrared communications, global area networks, and/or other suitable networks, etc., and/or any combination of two or more such networks.

Figure 2:
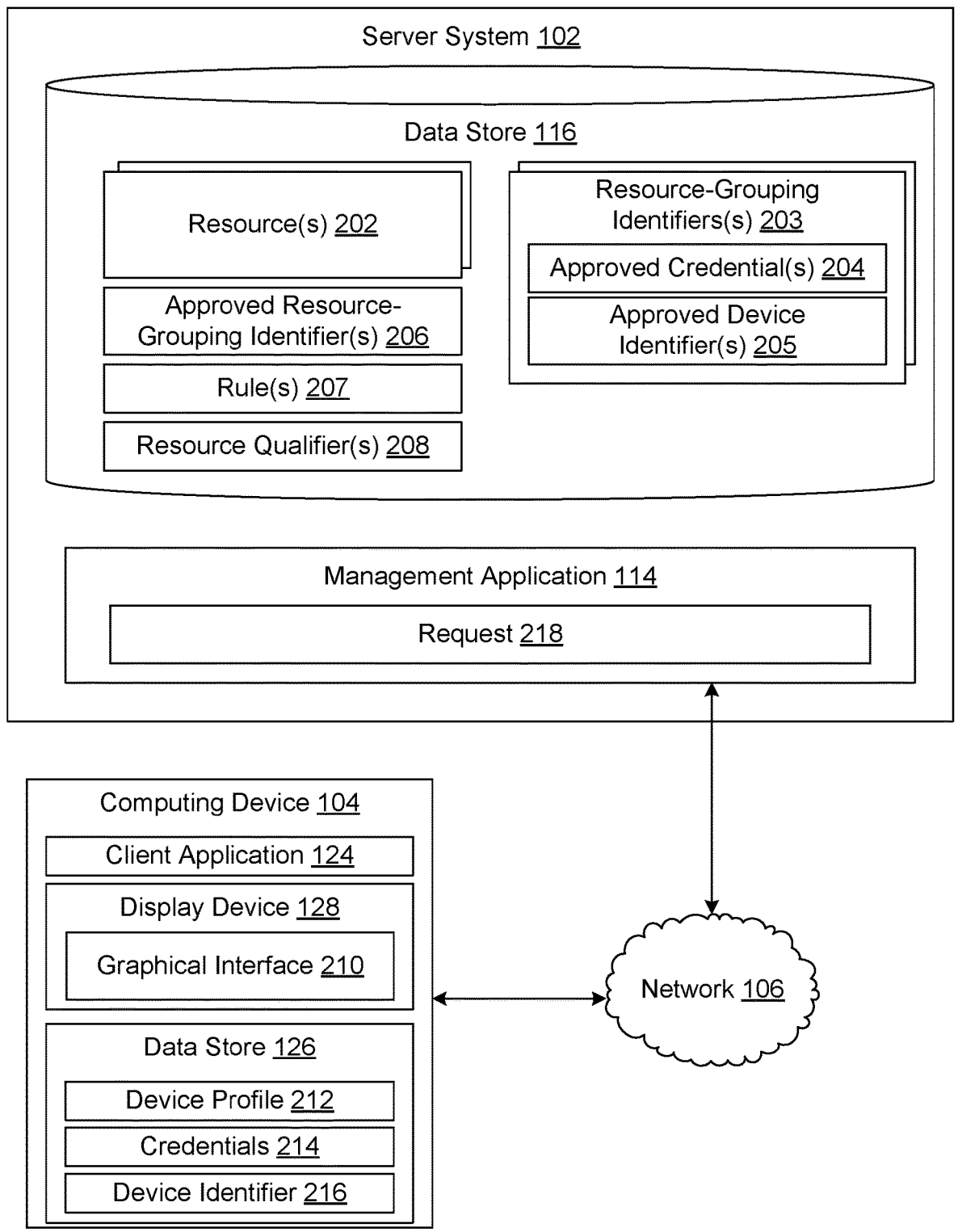
FIG. 2 is a modeling diagram depicting resources accessed by a client application and a management application for authorizing the use of resources by a computing device, according to some embodiments.

FIG. 2 is a modeling diagram depicting resources accessed by the client application 124 and/or the management application 114 for authorizing the use of resources 202 by the computing device 104, according to some embodiments.

The client application 124 can include any software configured for communicating with the management application 114 and/or remotely managing the computing device 104. The client application 124 may access information from its associated data store 126 such as a device profile 212, at least one of the credentials 214, a device identifier 216, and other data. In some embodiments, the device profile 212 may include hardware, software, and security attributes that describe and/or otherwise identify the computing device 104. For instance, the device profile 212 may represent hardware specifications of the computing device 104, version and configuration information of various software programs and hardware components installed on the computing device 104, transport protocols enabled on the computing device 104, version and usage information of various other resources stored on the computing device 104, and/or any other attributes associated with the state of the computing device 104. Additionally, the device profile 212 may include data indicating a date of a last virus scan of the computing device 104, a date of a last access by an administrator entity, a date of a last access by the server system 102, a date of a last service by an administrator entity, and/or any other data indicating a date of last maintenance.

The credentials 214 may uniquely identify the user and/or other entity authorized to operate the computing device 104. For example, the credentials 214 may include a username, a password, and/or biometric data related to facial recognition, retina recognition, fingerprint recognition, and the like.

The device identifier 216 may uniquely identify the computing device 104. The device identifier 216 may include a software identifier, a hardware identifier, and/or a combination of software and hardware identifiers. For example, the device identifier 216 may be a unique hardware identifier such as a Globally Unique Identifier ("GUID"), Universally Unique Identifier ("UUID"), Unique Device Identifier ("UDID"), serial number, Internationally Mobile Equipment Identity ("IMEI"), Wi-Fi Media Access Control ("MAC") address, Bluetooth MAC address, a processing device identifier, and/or the like, and/or any combination of two or more such hardware identifiers. The device identifier 216 may additionally or alternatively be represented by a unique software identifier such a token and/or certificate, based at least in part on the aforementioned unique hardware identifiers.

The client application 124 may be executed to transmit requests to access resources 202 stored at and/or accessible via the server system 102. In some embodiments, the client application 124 may be a secure container program that may be authorized to receive and render selected resources 202, as described herein. In some embodiments, the client application 124 may be a plug-in and/or additional software module for a browser and/or other application configured to be executed as described herein.

The client application 124 and/or another application on a computing device 104 managed by the client application 124 may access the resources 202 via a graphical interface 210 or other suitable interface rendered on the display device 128. The resources 202 may be presented in a graphical interface 210 by decompressing compressed files and presenting the uncompressed files, by mounting disk image files and presenting the mounted image files, by running executable files and presenting the executed files, by enabling a data search of the resources 202 and presenting the featured output in a user interface, by calling on another application on the computing device 104 to respond to data links contained within the resources 202, and/or by transmitting a part and/or the whole of the resources 202 to another application on the computing device 104.

In some embodiments, a client application 124 may be executed to present a single resource 202. In some embodiments, a client application 124 may be executed to present a series of resources 202 in a comprehensive manner. A non-limiting example of presenting a series of resources 202 in a comprehensive manner is presenting photograph files in a slideshow presentation. In some embodiments, the client application 124 may be executed to render an environment that presents multiple resources 202 in a single view, such as a category-based tree and/or outline format, based at least in part on a resource qualifier associated with the resources 202.

The client application 124 may also facilitate the modification of resources 202 provided by the management application 114 and the modification of data associated with the provided resources 202, if the computing device 104 and/or its user are authorized to perform such actions. For example, the client application 124 may include functionality for adding content to the existing resources 202, removing content from the existing resources 202, altering the content of existing resources 202, and/or the like, and/or any combination of manipulations of the resources 202.

The client application 124 may further be executed to add new resources 202 to be hosted by the server system 102, if authorized. For example, a user having administrator-level credentials 214 may interact with an I/O device 130 to manipulate the graphical interface 210 and thereby generate instructions to transfer copies of resources 202 locally stored on the computing device 104 to the server system 102 to be included in the data store 116. In some embodiments, the user of the computing device 104 may initiate upload of at least one of the resources 202 via the graphical interface 210 rendered by the client application 124, as can be appreciated. In addition, the user may indicate approved resource-grouping identifiers 206 for identifying groups of entities and/or devices that are permitted to access the uploaded resource 202 and specify rules 207 that may require compliance by a requesting entity in order to grant access to the uploaded resource 202 by the requesting entity, as will be described. In some embodiments, a user without administrator-level credentials 214 may manipulate the graphical interface 210 to transfer local copies of personal resources 202 to the server system 102. In this example, resources qualifiers associated with the personal resources 202 may be configured by default to restrict access by any other user.

A management function of the client application 124 can include optionally restricting access to the resources 202 by other applications executed by the computing device 104, thereby preventing access to the resources 202 from an application other than the client application 124. In some embodiments, the client application 124 may monitor network traffic between the computing device 104 and the server system 102. The client application 124 may identify from the network traffic any data being transmitted between an application executed by the computing device 104 other than the client application 124 and the server system 102. The client application 124 may determine whether a resource 202 is being provided to an application other than the client application 124 executed by the computing device 104. The client application 124 may intercept and/or block the incoming resource 202. In some embodiments, the client application 124 may allow the intercepted resource 202 to be accessible to the user via a graphical interface 210 rendered by the client application 124. In some embodiments, the client application 124 may deny access to the intercepted resource 202 by any other application on the computing device 104. Additionally, the client application 124 may be executed to call on other services associated with the resources 202 that are executed on the server system 102 and/or another server and/or device accessible to the client application 124, for instance, a technical support service that may be executed on the server system 102.

Certain applications and/or other functionality may be executed in the server system 102 according to some embodiments. The components executed on the server system 102, for example, include the management application 114 and other applications, services, processes, systems, engines, and/or functionality not disclosed in detail herein. The management application 114 is executed to provide resources 202 stored in the data store 116 and/or provide access to resources accessible by the server system 102. In addition, the management application 114 may also accept new resources 202 provided by the user of the computing device 104, and previously provided resources 202 modified by the user of the computing device 104, as will be described. The management application 114 can also be executed to communicate at least one command to the client application 124 for managing the computing device 104.

The data store 116 may include resources 202, resource-grouping identifiers 203, and/or other data. The resource-grouping identifiers 203 may represent unique identifiers for previously determined resource groupings and are used to determine which resources 202 are served up to the user of the computing device 104, as will be described. For example, a resource grouping may relate to organizational groups, organizational roles, geographic locations, and/or any other type(s) of grouping(s) that require access to a type of resource. Each resource grouping identifier 203 may be associated with a pairing of at least one of multiple approved credentials 204 and at least one of multiple approved device identifiers 205. In some embodiments, each combination of approved credentials 204 and approved device identifiers 205 may be associated with more than one of the resource-grouping identifiers 203. Additionally, the pairing of approved credentials 204 and approved device identifiers 205 may be associated with a user's organizational role and/or capacity. For instance, the pairing of approved credentials 204 and the approved device identifiers 205 may be predetermined by a technical services administrator and/or other administrative entity. In some embodiments, the pairing of approved credentials 204 and the approved device identifiers 205 may be automatically associated with the resource-grouping identifiers 203 based at least upon a user's pay grade, organizational level, status within the organization, and/or any other organizational factor.

Each resource 202 may be associated with a listing of approved resource-grouping identifiers 206 and at least one of the rules 207. In some embodiments, the listing of approved resource-grouping identifiers 206 includes at least some of the resource-grouping identifiers 203 that regulate access to the respective resource 202. In some embodiments, the listing of approved resource-grouping identifiers 206 may be predetermined by an administrator entity. For instance, the administrator entity may specify which of the resource-grouping identifiers 203 are permitted access to a respective at least one of the resources 202. Additionally or alternatively, rules 207 may regulate how an entity having a combination of the appropriate credentials 214 and device identifier 216 may access the respective resource 202. For example, in some embodiments, the rules 207 may describe a required and/or a permitted state that an accessing computing device 104 may satisfy in order for the computing device 104 to be permitted access to the resource 202. Non-limiting examples of rules 207 may include (but are not) limited to hardware requirements, software requirements, configuration requirements, maintenance requirements of a computing device, and/or requirements related to the resource 202.

In some embodiments, hardware requirements may include requirements associated with a processor of the computing device 104, memory, power supply, external storage, peripherals, and/or the like. Software requirements may include requirements associated with the operating system type and version, operating system authenticity and jailbreak/rooted status, installed application types and versions, and/or the like. Configuration requirements may include requirements associated with the configuration of the hardware, software, data encryption methods, transport protocols, and/or the like. Maintenance requirements may include requirements associated with the date of last virus scan for the computing device 104, the date of the last access of the computing device 104 by an administrative entity, the date of last communication between the computing device 104 and the server system 102, the date of last tune-up of the computing device 104, and/or the like. Requirements related to the resource 202 may include whether the resources 202 may be rendered while the computing device 104 is offline and/or not in communication with the management application 114, whether to permit synchronization of the resources 202 with a remote data store, whether to restrict the resources 202 from being forwarded, whether to permit storing resources 202 locally on the computing device 104, and/or the like. Alternatively, the resources 202 and rules 207 may be stored on another data store accessible to the computing device 104 and/or other storage facility in data communication with the server system 102, such as an internal email server, a web-based email server, an internal file server, a third-party hosted file server, a cloud-based server, and/or a cached local data store on the computing device 104.

Each resource 202 may be associated with at least one of the resource qualifiers 208. In some embodiments, a resource qualifier 208 may be and/or include metadata that describes and/or regulates the use of a respective at least one of the resources 202. For example, a resource qualifier 208 may include categories/sub-categories to which at least one of the resources 202 belong, an indication that at least one of the resources 202 are considered favorites, an indication of whether at least one of the resources 202 are privately owned, publicly owned, and/or enterprise-owned, an indication of whether at least one of the resources 202 are confidential, an indication of whether at least one of the resources 202 are password protected, an indication of the historical version of at least one of the resources 202, a description of at least one of the resources 202, at least one comment regarding at least one of the resources 202, an indication of the size and format of at least one of the resources 202, an indication of the download priority associated with at least one of the resources 202, an indication of the expiration date associated with at least one of the resources 202, an indication of the effective date associated with at least one of the resources 202, an indication of the ownership of at least one of the resources 202, an indication of the managing party of at least one of the resources 202, and/or the like, and/or any combination of resource qualifiers.

A user and/or other entity operating a computing device 104 may wish to access resources 202 stored on the server system 102. In some embodiments, the user may manipulate a graphical interface 210 rendered by the client application 124 to transmit a request 218 for accessing at least one of the resources 202 on the server system 102. For instance, the user may provide credentials 214, such as, a unique user name, a password, biometric data, and/or other types of credentials 214 to request access to the server system 102. The client application 124 may transmit the request 218 to the management application 114. In some embodiments, the request 218 may include the credentials 214 provided by the user, the device identifier 216 that uniquely identifies the computing device 104, and/or any other relevant information.

The management application 114 and/or another service provided by the server system 102 receives the request 218 and determines whether the user is authorized to access the resources 202 from the computing device 104. For example, the management application 114 may determine that the user is authorized to access the resources 202 from the computing device 104 based on the credentials 214 and the device identifier 216 provided with the request 218.

Upon determining that the user is authorized to access the resources 202 from the computing device 104, the server system 102 determines which of the resources 202 to provide to the computing device 104. In some embodiments, the management application 114 determines which resources 202 to provide based on resource-grouping identifiers 203 associated with each resource 202. For instance, the management application 114 may determine which resource-grouping identifiers 203 are associated with the pairing of credentials 214 and the device identifier 216 included in the request 218. In some embodiments, the management application 114 parses the listing of approved credentials 204 and the listing of approved device identifiers 205 of each resource grouping identifier to determine whether the respective resource grouping identifier is associated with both the credentials 214 and the device identifier 216. The management application 114 may identify a resource 202 to provide to the computing device 104 based on the determined resource-grouping identifiers 203. In some embodiments, the management application 114 identifies at least one of the resources 202 associated with each one of the determined resource-grouping identifiers 203. In some embodiments, the management application 114 identifies a resource 202 that is associated with the determined resource-grouping identifiers 203. Additionally, in some embodiments, the management application 114 identifies the resource 202 if it is associated with a threshold number of the resource-grouping identifiers 203. The management application 114 may provide the identified resources 202 to the user of the computing device 104.

In some embodiments, the management application 114 may additionally determine whether the computing device 104 from which the user requested access to the resources 202 complies with the rules 207 associated with each one of the identified resources 202. For example, the management application 114 may determine whether the device profile 212 describing the state of the computing device 104 complies with the rules 207 of each identified resource 202. As discussed above, the device profile 212 may include hardware specifications of the computing device 104, software specifications of the computing device 104, version information of various other components of the computing device 104, and/or any other information profiling the computing device 104. In some embodiments, the management application 114 may provide each identified resource 202 to the user if the computing device 104 complies with all of, or at least a portion of, the rules 207 associated with each of the identified resources 202. Additionally, in some embodiments, the management application 114 may provide the identified resource(s) 165 to the user if the computing device 104 complies with at least a threshold number of the rules 207 associated with each of the identified resources 202.

Responsive to a determination that the computing device 104 is in a state of compliance with the rules 207, the management application 114 may be further executed to transmit the identified resources 202 to the computing device 104. In some embodiments, the management application 114 may automatically transmit the identified resources 202 to the computing device 104. In some embodiments, the management application 114 may make the identified resources 202 available for download by the computing device 104 based on a resource qualifier associated with the respective resource 202. For instance, the resource qualifier may indicate the respective resource 202 be made available for download to the computing device 104. In this example, the user may transmit a request to the management application 114 to download the respective resource 202.

In some embodiments, the state of the computing device 104 may have been modified between the time the management application 114 makes the identified resource 202 available for download and the time the management application 114 receives the request to download the identified resource 202. For example, the computing device 104 may have switched connectivity from a secured network 106 to an unsecured network 106. In this embodiment, the management application 114 may determine for a second time whether the computing device 104 complies with the rules 207. For example, the request to download transmitted from the computing device 104 may include an updated device profile 212. The management application 114 may make the second determination of whether the computing device 104 complies with the rules 207 based on the updated device profile 212. For instance, the rules 207 may require that the computing device 104 be connected to a secured network 106 to gain access to the resource and the second determination of compliance may reveal that the computing device 104 is connected to an unsecured network 106. Responsive to the second determination that the computing device 104 complies with the rules 207, the management application 114 provides the requested resource 202. In some embodiments, the client application 124 may manage computing device 104 on behalf of the management application 114 by periodically transmitting the device profile 212 to the server system 102. In this embodiment, each time the device profile 212 is transmitted to the server system 102, the management application 114 may determine whether the updated computing device 104 complies with the rules 207 using the updated device profile 212.

In some embodiments, the management application 114 may transmit rules 207 associated with each one of the identified resources 202 to the computing device 104. For example, the management application 114 may transmit the rules 207 to the client application 124 involved in managing the computing device 104 for determining whether the computing device 104 complies with the rules 207. In some embodiments, the management application 114 may not determine whether the computing device 104 complies with the rules 207 of each of the identified resources 202 and instead permits the client application 124 to make this determination. For instance, the client application 124 may determine whether the computing device 104 complies with the rules 207 associated with the received resource 202 prior to rendering the received resource 202 on the display device 128.

In some embodiments, the management application 114 may transmit the rules 207 to the computing device 104 prior to transmitting the identified resources 202. The client application 124 may determine whether the computing device 104 complies with the rules 207, as described above. The client application 124 may transmit an indication back to the management application 114 of the compliance status. Responsive to receiving an indication from the computing device 104 that the computing device 104 complies with all and/or a sufficient portion of the rules 207 associated with each respective resource 202, the management application 114 may transmit the appropriate identified resources 202 to the computing device 104. Additionally, the client application 124 may store the rules 207 in a memory associated with the computing device 104, such as the data store 126. Upon subsequent requests 218 to access the identified resource 202, the management application 114 may wait to receive an indication from the client application 124 that the computing device 104 complies with the rules 207 associated with the requested resource 202 to determine whether to transmit the requested resource 202. For example, the client application 124 may use the stored rules 207 received from a previous request to make the determination and transmit the request 218.

The management application 114 may be further executed to log activity related to the resources 202 for asset tracking purposes. For example, the management application 114 may log activities such as transmission of resources, historical data related to the transmission of the resource, data related to the rendering of the resources 202 by the computing device 104, data related to a storage location of the resources 202, data related to communication with the computing device 104, data related to resource qualifiers associated with the resources 202, data related to computing device 104 compliance with rules 207, data related to usage and availability of bandwidth, and/or any other data related to the resources 202.

In an additional embodiment, the management application 114 may periodically determine whether the transmitted resources 202 have been modified on the computing device 104. The management application 114 may synchronize the modified resource 202 on the computing device 104 with the unmodified resource 202 on the server system 102. For instance, the management application 114 may determine whether the resource 202 has been modified based on an edit date, modified date, and/or an access date associated with the resource 202. In this embodiment, the management application 114 may periodically request to receive the relevant date from the client application 124. Upon receiving the relevant date, the management application 114 compares the relevant date from the computing device 104 with the corresponding date on the server system 102 and determines to synchronize the respective resources 202 if the two relevant dates do not match. For instance, the management application 114 may employ a synchronization approach as is known in the art. In some embodiments, the management application 114 may employ the synchronization approach based on determining whether the user is permitted to modify the resource 202 on the computing device 104. In some embodiments, the management application 114 may remove the resource 202 on the computing device 104 upon synchronizing with the server system 102. In some embodiments, the management application 114 stores the modified resource 202 in the data store 116 as one of multiple versions of the respective resource 202.

In some embodiments, the client application 124 may be pre-authorized to access at least some of the resources 202 hosted by the server system 102. In such embodiments, the management application 114 may be configured to provide to the client application 124 a listing of resources 202 available for download by the computing device 104 based only on certain embedded authorization data (e.g., device identifier 216, and/or device profile 212, etc.) and without requiring the client application 124 to provide additional authorization data (e.g., user name and password). For example, the management application 114 may identify resources 202 to include in the listing by determining which of the resources 202 are associated with rules 207 that correspond with the device profile 212 of the computing device 104. The management application 114 may allow the client application 124 to download at least some of the available resources 202. However, at least one of the available resources 202 may be associated with a distribution rule that requires additional authorization. For instance, the resource 202 may be a document containing sensitive information that requires authorization of a username and password and/or other additional authorization data. Thus, if the client application 124 submits a request to download such a resource 202, the management application 114 may prompt the client application 124 to provide additional authorization data. In response, the client application 124 may prompt the user to provide credentials 214. In some embodiments, the client application 124 may transmit the credentials 214 and/or the device identifier 216 of the computing device 104 to the management application 114. Upon determining that the user is authorized to access the sensitive resource 202 from the computing device 104, the management application 114 may allow the client application 124 to download the sensitive resource 202.

Although the management application 114, client application 124, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of or a combination of a number of technologies. These technologies may include, but are not limited to, discrete logic circuits having logic gates for implementing various logic functions upon an application of at least one of data signals, application specific integrated circuits having appropriate logic gates, and/or other components, etc. Such technologies are generally well known by those skilled in the art and, consequently, are not described in detail herein.

Controlling Access to Resources Via Electronic Meeting

The management application 114 executed at the server system 102 can control the use of resources 202 and other electronic content accessed via an electronic meeting between multiple computing devices 104, as described in detail with respect to FIGS. 3-6.

Figure 3:
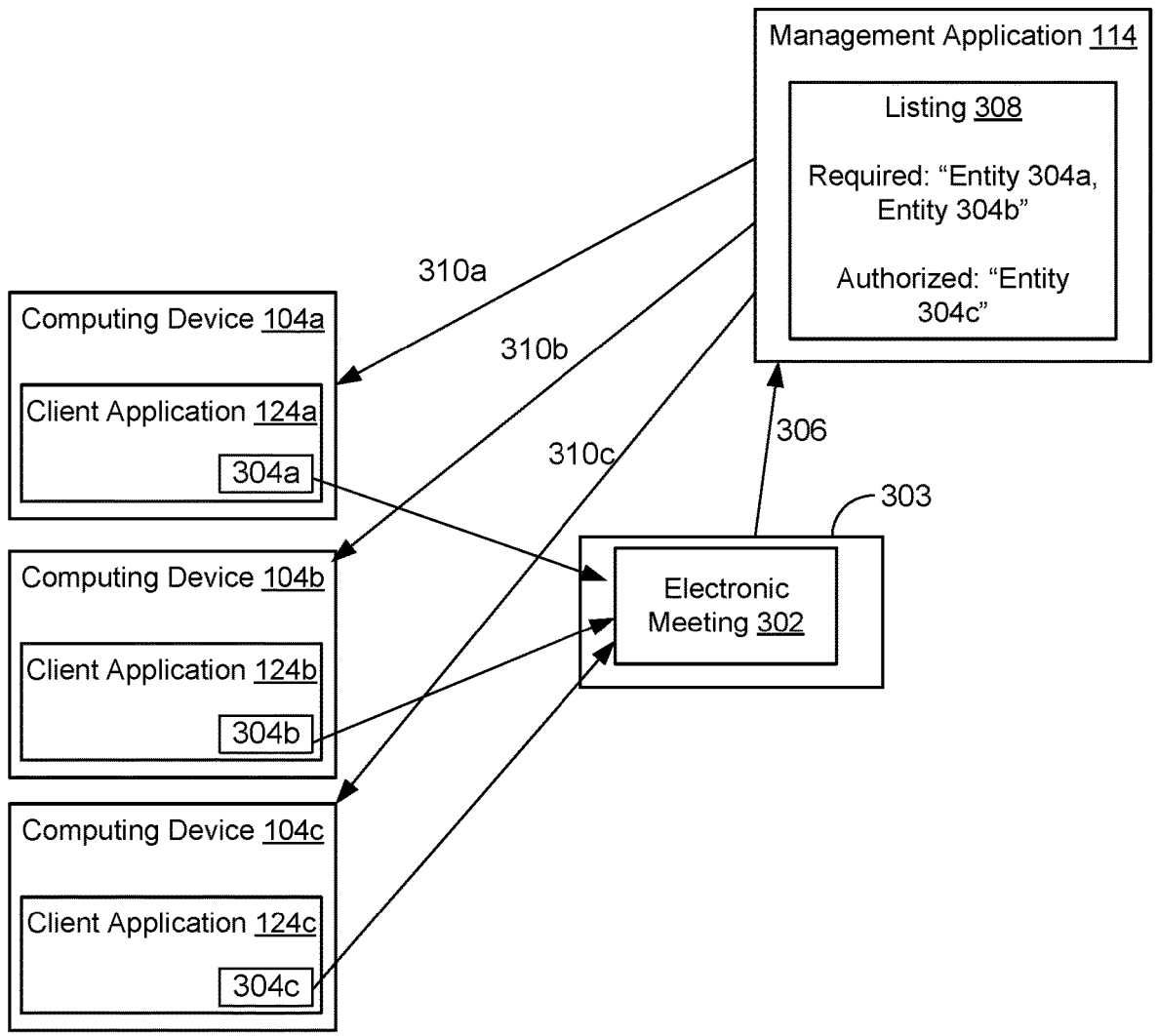
FIG. 3 is a modeling diagram depicting an example flow of communications among a management application and multiple computing devices accessing an electronic meeting, according to some embodiments.

FIG. 3 is a modeling diagram depicting an example flow of communications among a management application 114 and multiple computing devices 104a-c accessing an electronic meeting 302.

The electronic meeting 302 can include at least one function for sharing resources 202 provided by the server system 102 and/or other electronic content. For example, entities accessing the electronic meeting 302 may transmit copies of resources 202 among the computing devices 104a-c, render the resources 202 for display at the computing devices 104a-c, and/or making the resources 202 available for use at least one of the computing devices 104a-c.

The electronic meeting 302 may be hosted via the server system 102 and/or another server system with which the management application 114 can communicate. In some embodiments, a communication application 303 configured to access the resources 202 may host the electronic meeting 302, as depicted in FIG. 3. The management application 114 can moderate requests for access to resources 202 transmitted by the communication application 303. Moderating requests for access to the resources 202 can include ensuring that resources 202 are provided via the electronic meeting 302 to computing devices 104a-c according to any applicable rules 207, as described above with respect to FIG. 2. The communication application 303 can retrieve and/or otherwise access the resources 202 on behalf of the participating entities 304a-c and/or provide the resources to the computing devices 104a-c via the electronic meeting 302. Additionally or alternatively, the communication application 303 can receive requests 218 for resources 202 from the computing devices 104a-c via the electronic meeting 302 and transmit the requests to the management application 114, which can transmit the requested resources 202 to the requesting devices. In some embodiments, the management application 114 may host the electronic meeting 302.

Computing devices 104a-c accessing resources 202 via an electronic meeting may be authenticated, managed, and/or otherwise determined to be compliant with rules 207 via any suitable manner.

In some embodiments, the client applications 124a-c may include at least one electronic meeting function via which the computing devices 104a-c may respectively access and/or establish an electronic meeting 302. The client applications 124a-c may be installed on the respective computing devices 104a-c prior to the electronic meeting 302 being established. If an instance of the client application 124 is not installed to a computing device, the computing device may be unable to access the electronic meeting 302 and/or communicate resources 202 and/or other electronic content via the electronic meeting 302.

In some embodiments, a dedicated electronic meeting application other than the client application 124 can be used to establish and/or access the electronic meeting 302. The dedicated electronic meeting application may be required to communicate with the management application 114 via the electronic meeting 302 via the client application 124. The client application 124 may be a plug-in module added to the dedicated electronic meeting application and/or a separate application used for accessing and/or communicating resources 202 via the electronic meeting 302. A computing device 104 may be able to access the electronic meeting 302 the dedicated electronic meeting application without the client application 124 if the computing device 104 does not access the resources 202 provided by the server system 102. The management application 114 may push and/or otherwise provide the client application 124 to computing devices on which the client application 124 is not installed in response to the computing device requesting access to the resources 202 via the electronic meeting 302. The instance of the client application 124 may automatically be installed to the computing device 104 without intervention by an operator of the computing device 104. Additionally or alternatively, the computing device 104 may provide a prompt to the operator requesting authorization to install the instance of the client application 124. Upon the operator affirming that the client application 124 may be installed, the computing device 104 can install the instance of the client application 124.

In some embodiments, the management application 114 can automatically establish the electronic meeting 302 based on the presence of computing devices 104a-c corresponding to entities permitted to access the electronic meeting 302. The management application 114 can search for a beacon and/or other identification signal broadcasted and/or otherwise transmitted by each of the computing devices 104a-c. The beacon and/or other identification signal can identify the computing device as being available for the electronic meeting 302. The management application 114 can search for the beacon at predetermined times during a time period in which the electronic meeting 302 is scheduled to occur and/or continuously search for the beacon during the time period. In some embodiments, the management application 114 can broadcast a discovery signal. The discovery signal can be received by the computing devices 104a-c at which the client applications 124a-c are respectively executing. Each of the client applications 124a-c can transmit a response to the discovery signal. The response can notify the management application 114 that the computing devices 104a-c are available to join the electronic meeting 302. At least one of the client applications 124a-c may automatically transmit a response to the management application 114 without intervention by respective operators of the computing devices 104a-c. Additionally or alternatively, at least one of the client applications 124a-c may provide a prompt to the respective operator and transmit a response to the management application 114 based on the respective operator affirming that he and/or she wishes to join the electronic meeting 302

The client applications 124a-c may transmit data via the electronic meeting 302 identifying the entities 304a-c accessing and/or requesting access to the electronic meeting 302. The entities 304a-c can be identified by any suitable identifier, such as a device profile 212, at least one of credentials 214, a device identifier 216, and/or a combination thereof. In some embodiments, an identifier for an entity can identify the operator of a computing device. The identifier can include a user name for the operator. In some embodiments, an identifier for an entity can identify the computing device accessing requesting access to the electronic meeting. Non-limiting examples of identifiers for computing devices 104a-c include an internet protocol ("IP") address and/or a MAC address. In some embodiments, an entity may identified by a pairing of an operator identifier and a device identifier.

The management application 114 may obtain data 306 from the electronic meeting 302 identifying the entities 304a-c, such as the device profile 212, at least one of credentials 214, a device identifier 216, and/or a combination thereof provided by each of the client applications 124a-c. In some embodiments, the communication application 303 can push the data 306 to the management application 114. In some embodiments, the management application 114 can pull and/or otherwise retrieve the data 306 from the communication application 303.

The management application 114 may authenticate and/or otherwise identify each of the entities 304a-c accessing and/or requesting access to the electronic meeting 302 from the data 306. The management application can access a listing 308 stored in the data store 116. The listing 308 can include a list of entities that are required to participate in the electronic meeting 302 in order for the management application 114 to authorize the communication of at least one of the resources 202 and/or other electronic content. For example, as depicted in FIG. 3, the entities 304a, 304b are listed as required participants for the electronic meeting 302. The listing 308 can also include a list of other entities that are authorized to access the electronic meeting 302. For example, as depicted in FIG. 3, the entity 304c is listed as an authorized participant. The management application 114 may not require the participation of the entity 304c (i.e., an authorized but not required entity) in the electronic meeting 302 as a prerequisite to communication of at least one of the resources 202 and/or other electronic content among the entities 304a-c. In some embodiments, authorized but not required entities (e.g., entity 304c) may not have access to some or all of the resources 202 and/or other electronic content made available to required entities (e.g., entities 304a, 304b).

Any suitable mechanism and/or process can be used for authorizing communication of the at least one of the resources 202 and/or other electronic content among the entities 304a-c via the electronic meeting 302. For example, the management application 114 can authorize the communication of the resources 202 and/or other electronic content by respectively providing tokens 310a-c to the client applications 124a-c, as depicted in FIG. 3. The tokens 310a-c can include an authorization to access the resources 202 and/or other electronic content from the data store 116 of the server system 102 and/or another server system in communication with the management application 114. The tokens 310a-c can respectively identify that requests for the resources 202 from the entities 304a-c, the client applications 124a-c, and/or the computing device 104a-c are to be granted. In some embodiments, the tokens 310a-c can specify permissions (e.g., read, write, copy, etc.) for using the resources 202 and/or other electronic content. The tokens 310a-c can additionally or alternatively include data specifying that the use of the resources 202 and/or other electronic content is authorized during a scheduled time period for the electronic meeting.

In some embodiments, the management application 114 can perform at least one action enforcing the conditions specified in the tokens 310a-c as described above with respect to FIG. 2. For example, the management application 114 can add the tokens 310a-c to the approved credentials 204 in the data store 116. Each of the computing devices 104a-c can add a respective one of the tokens 310a-c to the credentials 214. In response to a request 218 that includes one of the tokens 310a-c with credentials 214, the management application 114 may determine resource-grouping identifiers 203 based on the credentials 214 of the requesting entity and/or the device identifier 216 of the computing device 104 corresponding to the entity. For example, each resource grouping identifier 203 may be associated with a pairing of credentials 214 (including at least one of the tokens 310a-c) and a device identifier 216. The management application 114 may determine at least one of resource-grouping identifiers 203 associated with the pairing of credentials 214 and the device identifier 216. The management application 114 can identify the resources 202 that are associated with the determined resource-grouping identifiers 203. The management application 114 can determine whether a computing device 104 from which the request 218 originated complies with the rules 207 associated with each one of the identified resources 202. If the management application 114 determines that the computing device 104 complies with the rules 207, the management application 114 can transmit the identified resources 202 associated with the rules 207 via the electronic meeting 302. In some embodiments, the management application 114 automatically transmits the identified resources 202 that the computing device 104 is authorized to receive. In some embodiments, the management application 114 may make the identified resources 202 available for download. For example, a computing device 104 may receive an indication that the resource 202 is available for download. The computing device 104 may transmit a request to the management application 114 for downloading the applicable resource 202. Upon receiving the request, the management application 114 may transmit the resource 202 to the computing device 104.

In some embodiments, the client applications 124a-c can manage the computing devices 104a-c based on the conditions specified in the tokens 310a-c. For example, a client applications 124 may block attempts to access resources 202 in violation of the conditions specified in the tokens 310a-c. The client application 124 may receive at least one of the rules 207 from the server system 102 along with the token. Each of the received rules 207 may be associated with at least one of the resources 202 identified in the token. The client application 124 can determine compliance with the at least one of the rules 207 received by the client application (e.g., based on the device profile 212 for the requesting computing device). If the client application 124 determines a request to access resources 202 via the electronic meeting 302 is not compliant with some and/or all of the received rules 207, the client application 124 can render a notice of non-compliance on a display device 216 of the computing device 104. The client application 124 may additionally or alternatively transmit a notification to the management application 114 indicating that the computing device 104 is non-compliant. If the client application 124 determines that the request to access resources 202 via the electronic meeting 302 is compliant with all and/or a portion of the sets of rules 207, the client application 124 can transmit a notification of compliance to the management application 114. The client application 124 can obtain the resources 202 associated with the rules 207 with which the requesting computing device 104 complies. The resources 202 may be obtained via the electronic meeting 302.

In some embodiments, the management application 114 can authorize the communication of electronic content by granting access to the resources 202 and/or other electronic content by the communication application 303. For example, the management application 114 may provide a token to the communication application 303 and/or add a temporary credential for the communication application 303 to the approved credentials 204 stored in the data store 116. In some embodiments, the token and/or temporary credential may be valid for a particular period of time corresponding to a scheduled start time and/or end time for the electronic meeting 302.

Figure 4:
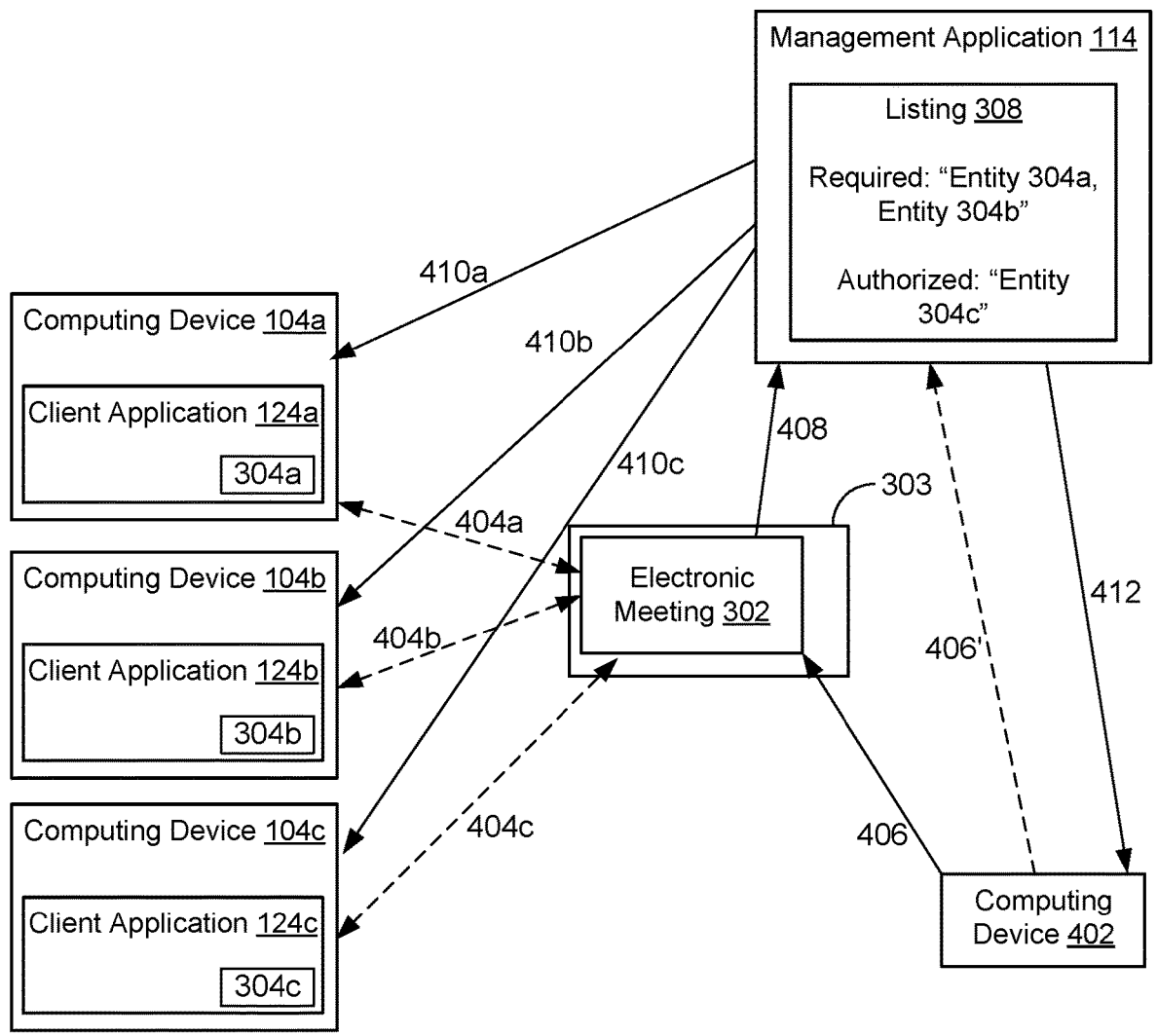
FIG. 4 is a modeling diagram depicting an example flow of communications among a management application, multiple computing devices accessing an electronic meeting, and an unauthorized entity or device according to some embodiments.

In some embodiments, the management application 114 can implement at least one security measure to prevent unauthorized entities from accessing electronic content communicated via the electronic meeting 302. FIG. 4 is a modeling diagram depicting an example flow of communications among the management application 114, the computing devices 104a-c, and an unauthorized entity.

Each of the computing devices 104a-c can respectively access the electronic meeting 302 via the connections 404a-c. Another computing device 402 can attempt to access the meeting and/or be otherwise detected by the management application 114. This other computing device 402 can correspond to an unauthorized entity 406. In some embodiments, the management application 114 can detect an unauthorized entity 406 accessing and/or attempting to access the electronic meeting 302, as depicted in FIG. 4 by the computing device 402 identifying the entity 406 to the electronic meeting 302. The management application can receive data 408 identifying the entity 406. In some embodiments, the management application 114 can detect the unauthorized entity 406 based on data received via a communication channel other than the electronic meeting 302, as depicted in FIG. 4 by the computing device 402 communicating the data 406' identifying the unauthorized entity 406. The data 406' may be received via a router and/or other network communication device providing network connectivity to the computing devices 104a-c and the computing device 402. For example, the management application 114 may receive the data 406' from a router and/or other network communication device via a direct connection between the router and the server system 102 and/or a connection with another server system in communication with the router.

The management application 114 can determine that the entity 406 and/or the computing device 402 are not authorized to access the electronic meeting 302 via any suitable process. In one non-limiting example, management application 114 can determine that the entity 406 is not included in the listing 308. In another non-limiting example, the management application 114 can determine that authentication data for the entity 406 (e.g., a user name and/or password) is invalid. In another non-limiting example, the management application 114 can determine that the computing device 402 corresponding to the unauthorized entity 406 fails to comply with at least one of the rules 207 and/or another rule governing access to the resources 202.

The management application 114 can restrict communication of at least one of the resources 202 and/or other electronic content based on determining that the entity 406 is not authorized to access the electronic meeting 302. In some embodiments, restricting the communication of electronic content can include restricting the computing devices 104a-c and/or the entities 304a-c to communicating a subset of electronic content. For example, an electronic meeting 302 that involves sharing both publicly available resources 202 and secret and/or otherwise sensitive resources 202 may be restricted to sharing only the publicly available resources 202 in the presence of the unauthorized entity 406. In some embodiments, restricting the communication of electronic content can include barring any communication of electronic content in the presence of the unauthorized entity 406.

Any suitable mechanism and/or process can be used for restricting communication of the at least one of the resources 202 and/or other electronic content among the entities 304a-c. In some embodiments, the management application 114 can restrict the communication of the resources 202 and/or other electronic content by respectively providing updated tokens 410a-c to the client applications 124a-c to replace tokens 310a-c, as depicted in FIG. 4. In one non-limiting example, the tokens 410a-c can include an authorization to access fewer of the resources 202 as compared to the tokens 310a-c. In another non-limiting example, the tokens 410a-c can specify permissions (e.g., read, write, copy, etc.) for using the resources 202 and/or other electronic content that are more restrictive as compared to permissions specified by the tokens 310a-c. The conditions specified in the tokens 410a-c can be enforced by the client applications 124a-c, the management application 114, and/or some combination thereof as described above with respect to FIG. 3.

In some embodiments, the management application 114 can restrict the communication of the resources 202 and/or other electronic content by restricting access to the resources 202 and/or other electronic content by the communication application 303. For example, the management application 114 may invalidate any tokens previously provided to the communication application 303 and provide a new token to the communication application 303 that specifies a more restrictive permission level and/or subset of resources 202 that the communication application 303 may access.

In some embodiments, the management application 114 can restrict communication of the resources 202 and/or other electronic content based on a required entity leaving the electronic meeting 302 and/or a computing device corresponding to a required entity leaving the electronic meeting 302 and/or a specified geographic area.

In some embodiments, the management application 114 can direct the communication application to terminate the electronic meeting 302 based on a required entity leaving the meeting, a computing device corresponding to a required entity leaving a specified geographic area in which the computing device 104a-c are positioned, an unauthorized entity 406 accessing and/or attempting to access the electronic meeting, and/or an unauthorized computing device 402 entering a specified geographic area in which the computing device 104a-c are positioned.

In some embodiments, the management application 114 can perform a remedial action in response to detecting an unauthorized entity 406 and/or an unauthorized computing device 402 for a computing device 402 that can be managed by the management application 114. A remedial action can include at least one security measure for preventing the unauthorized entity 406 from accessing the resources 202. A remedial action can be specified at least one rule stored in the data store 116 and governing access to the resources 202. An instance of the client application 124 may be installed on the computing device 402. The application 124 may include at least one management function for managing the computing device 402 in response to commands received from the management application 114. The client application 124 can perform the remedial actions at the computing device 402 in response to commands from the management application 114.

The remedial action can include transmitting data 412 to the computing device 402. In some embodiments, the data 412 can include command to a client application 124 executing on the computing device 402. The command can direct the client application to erase some or all content from the computing device 402 (i.e., perform a "device wipe"). In some embodiments, the data 412 can include a software update to be installed on the computing device 402. The software update can update the computing device 402 such that the computing device 402 is compliant with at least one rule governing access to the resources 202.

In some embodiments, the remedial action can involve notifying an administrative entity of the presence of the unauthorized entity 406 and/or the unauthorized computing device 402. For example, the presence of an unauthorized computing device 402 detected in the vicinity of the computing devices 104a-c may trigger an alert to an administrator and/or security personnel. The administrator and/or security personnel may respond by escorting the user of the unauthorized computing device 402 from the premises.

In some embodiments, each of the computing devices 104a-c may be positioned in a geographical location in which network connectivity is provided by at least one network communication device that can be controlled by the management application 114. For example, network device(s), such as routers and/or computing systems in communication with routers, may provide network connectivity to the computing devices 104a-c accessing the electronic meeting 302. The management application 114 may communicate with the network communication device(s) via another computing system configured to control the network communication device(s), such as a server system providing network connectivity between the computing devices 104a-c and the server system 102. The management application 114 may be able to restrict the operations of the unauthorized computing device 402 by communicating a command to the network communication device(s). The command communicated to the network communication device(s) can identify the computing device(s) 402 via any suitable identifier, such as an IP address and/or a MAC address. The command can direct the network communication device(s) to restrict and/or deny network access by the computing device(s) 402.

Figure 5:
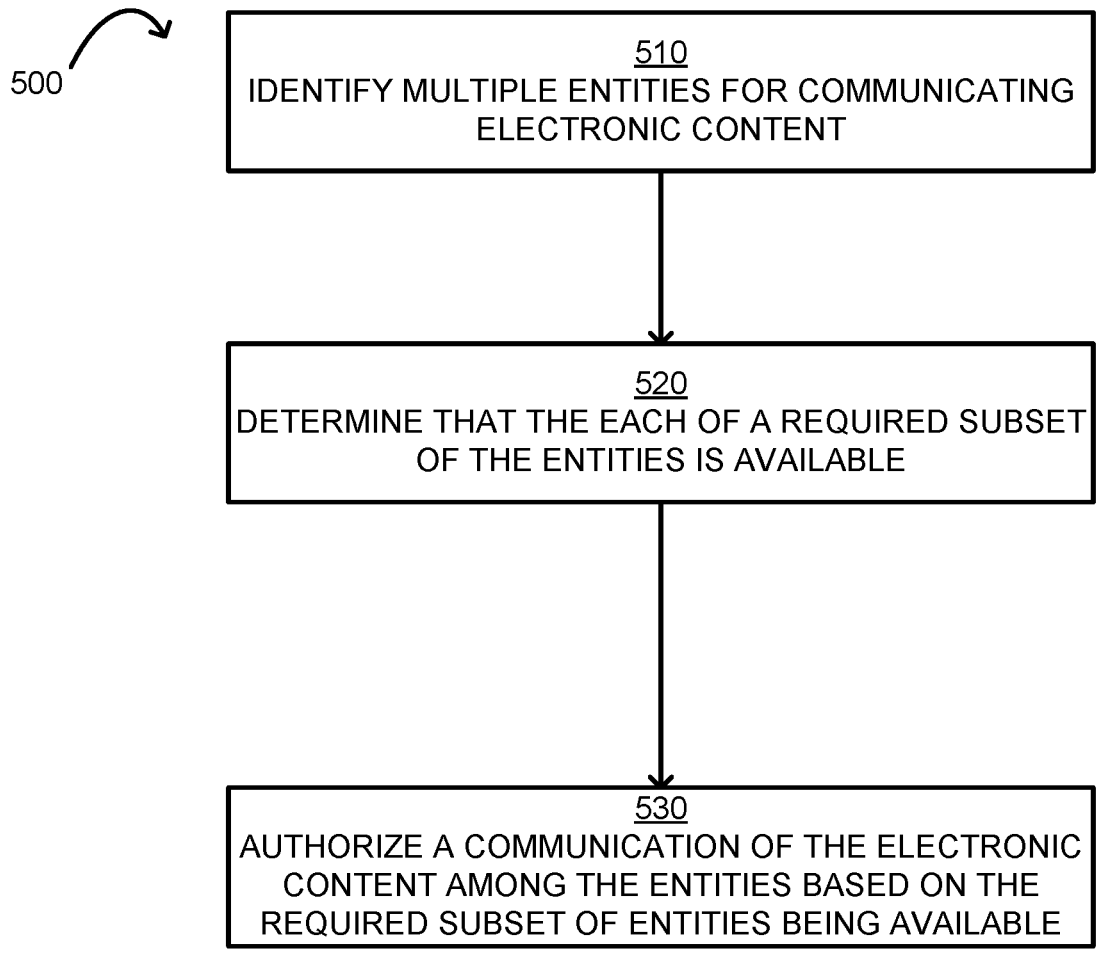
FIG. 5 is a flow chart illustrating an example method for controlling resources communicated among computing devices according to some embodiments.

FIG. 5 is a flow chart illustrating an example method 500 for controlling resources 202 and/or other electronic content communicated among computing devices 104a-c. For illustrative purposes, the method 500 is described with reference to the system implementations depicted in FIGS. 1-2 and the flows of communication depicted in FIGS. 3-4. Other implementations, however, are possible.

The method 500 involves identifying multiple entities available for communicating electronic content via an electronic meeting and/or other form of electronic communication, as shown in block 510. For example, the processor 108 of the server system 102 can execute the management application 114 to identify that entities 304a, 304b are required for communicating electronic content via an electronic meeting. The management application 114 can identify the required entities 304a, 304b in any suitable manner, such as accessing a listing 308.

The method 500 further involves determining that determining that each of a required subset entities is available for communication via the electronic meeting and/or other form of electronic communication, as shown in block 520. For example, the management application 114 can determine that the required entities 304a, 304b are accessing the electronic meeting 302. In some embodiments, the required subset of entities can include multiple entities whose availability is mandatory. In some embodiments, the required subset of entities can include a required number of entities (such as, but not limited to, a quorum) without requiring any specific entity be available. In some embodiments, the required subset of entities can include at least one mandatory entity and at least one additional entity selected from a group of required entities. For example, authorizing electronic communication may require the participation and/or availability of an entity 304a as well the participation and/or availability of either an entity 304b or an entity 304c. The participation and/or availability of entities 304a, 304b may be sufficient to authorize electronic communication. The participation and/or availability of entities 304a, 304c may also be sufficient to authorize electronic communication. In some embodiments, the required subset of entities can include a required entity and required number of additional entities (such as, but not limited to, a quorum) without requiring any specific entity of the additional entities be available.

Determining that the required entities 304a, 304b are accessing the electronic meeting 302 can include authenticating the required entities 304a, 304b based on respective authentication data provided by the respective client applications 124a, 124b. In some embodiments, the client applications 124a, 124b may authenticate the entities required 304a, 304b by verifying the authentication data. The client applications 124a, 124b can communicate successful verifications of the authentication data to the management application 114. In some embodiments, the client applications 124a, 124b may transmit the authentication data to the management application 114. The management application 114 can verify the authentication data provided by the client applications 124a, 124b.

In some embodiments, authentication data can include information provided by the required entities 304a, 304b to the client applications 124a, 124b. Non-limiting examples of authentication data provided by the required entities 304a, 304b include a password, a personal identification number, at least one answer to at least one secret question, a token, and the like.

In some embodiments, the authentication data can include biometric information associated with each of the required entities 304a, 304b. For example, a required entity 304a using a computing device 104a may access fingerprint scanning function provided by the client application 124a and/or another application. The required entity 304a may scan at least one of his and/or her fingerprints.

In some embodiments, determining that the required entities 304a, 304b are accessing the electronic meeting 302 can include determining that the respective client applications 124a, 124b at the computing devices 104a, 104b is accessing a common collaborative session via the network 106. For example, each of the computing devices 104a, 104b may be executing a respective application for accessing a web meeting and/or other media conference. The management application 114 can identify the computing devices 104a, 104b corresponding to the required entities 304a, 304b based on at least one identifier provided for accessing the collaborative session, such as an IP address and/or MAC address associated with each of the computing devices 104a-c.

In some embodiments, determining that each of the required entities 304a, 304b is accessing the electronic meeting 302 comprises determining that each of the computing devices 104a, 104b is positioned in a common geographical location. The management application 114 may identify the common geographical location by reference to a file and/or other data stored in a data store 116. The common geographical location can be defined in any suitable manner. In some embodiments, a common geographical location may be delineated by fixed boundaries. In some embodiments, a common geographical location may be defined by a proximity to at least one reference location, such as (but not limited to) a distance from at least one base station in a telecommunication system and/or access points in a wireless data network.

The management application 114 can determine that the computing devices 104a, 104b corresponding to required entities 304a, 304b are positioned in a common geographic location via any suitable process. In some embodiments, the management application 114 can detect and/or otherwise determine that each computing device is registered with the management application via a sensing device positioned in the common geographic location. For example, one or more radio-frequency identification ("RFID") scanners may be positioned at one or more respective locations in a geographic location. Each of the computing devices 104a, 104b may display an RFID identifier and/or have an RFID identifier affixed to it. The RFID identifier can be scanned by an RFID scanner. Data from the RFID scanner identifying the scanned computing devices can be communicated to the management application 114, thereby allowing the management application 114 to identify the scanned computing device 104. In some embodiments, a control device can be configured to detect that the computing devices 104a-c are positioned in the common geographic location by establishing radio communication with the computing devices 104a, 104b via at least one field communication ("NFC") process. Non-limiting examples of NFC processes include touching each of the computing devices 104a, 104b to the control device and/or another sensor device and/or bring each of the computing devices 104a, 104b into close proximity with the control device. In some embodiments, the management application 114 can detect and/or otherwise determine that the computing devices 104a, 104b are positioned in a common geographic location by accessing the global positioning system ("GPS") coordinates for each of the computing devices 104a, 104b. In some embodiments, the management application 114 can determine that computing devices 104a, 104b such as smart phones are positioned in a common geographic location by triangulating the position of each computing device based on the distance of the computing device from each of multiple base stations in a telecommunication system.

In some embodiments, the management application 114 can determine that a required entity 304a, 304b has left the common geographical location. The management application 114 can restrict the communication of at least one of the resources 202 and/or other electronic content based on the participating required entity leaving the common geographical location. For example, the management application 114 may periodically update a stored list of the respective locations of the computing devices 104a-c. The management application 114 may determine during a first time period that a computing device 104a corresponding to a required entity 304a is positioned within the common geographical location. The management application 114 may authorize communication of at least one of the resources 202 and/or other electronic content via the electronic meeting 302 during the first time period. The management application 114 may determine during a second time period that the computing device 104a is positioned outside the common geographical location. The management application 114 may restrict communication of at least one of the resources 202 and/or other electronic content via the electronic meeting 302 during the second time period.

The method 500 further involves authorizing a communication of the electronic content among the required entities 304a, 304b and, optionally, any other authorized entities 304c via the electronic meeting and/or other form of electronic communication based on determining that each of the entities is available for communication, as shown in block 530. For example, the management application 114 can authorize the client applications 124a-c accessing the electronic meeting 302 to communicate at least one of the resources 202 provided by the server system 102 and/or other electronic content, as described above with respect to FIG. 3.

In some embodiments, the management application 114 can authorize the client applications 124a-c to communicate at least one of the resources 202 and/or other electronic content by decrypting the electronic content for use during the electronic meeting 302. The electronic content may be encrypted using an encryption key provided by the required entities 304a, 304b. The encryption key may be divided among the required entities 304a, 304b such that each entity has access to a respective portion of the encryption key. Each of the required entities 304a, 304b can provide a respective portion of the encryption key upon accessing the electronic meeting 302. For example, the portions of the encryption key may be stored on the computing devices 104a, 104b. The client applications 124a, 124b can retrieve the portions of the encryption key in response to the entities 304a, 304b accessing and/or requesting access to the electronic meeting 302. The client applications 124a, 124b can provide the portions of the encryption key to the management application 114. The management application 114 can combine and/or perform other operations on the portions of the encryption key into the encryption key and decrypt content to be shared via the electronic meeting 302. In one non-limiting example, a 256-bit key or other key can be partitioned. Each partition can be provided to a respective entity. The management application 114 can receive each partition and parse or otherwise combine the partitions to obtain an operable 256-bit key. In another non-limiting example, a 256-bit key or other key can be partitioned. Each partition can be provided to a respective entity. The management application 114 can receive each partition and execute an algorithm using the partitions to obtain an operable 256-bit key.

In some embodiments, the management application 114 can authorize the client applications 124a-c to communicate at least one of the resources 202 and/or other electronic content based on secondary authentication information generated from authentication data provided by the required entities 304a, 304b. In some embodiments, generating secondary authentication data can include combining the authentication data received from the required entities 304a, 304b. For example, the management application may concatenate and/or otherwise join a group of passwords to form a combined password. The combined password may be used to verify that the electronic content can be communicated during the electronic meeting 302. In some embodiments, generating secondary authentication data can include generating authentication data that is different from the separate authentication data received from the required entities 304a, 304b. For example, the management application may receive a personal identification number from each of the required entities 304a, 304b. The management application can perform mathematical operations (e.g., addition and/or multiplication) on the received personal identification numbers. The output of the mathematical operation(s) can be a new identification number. The new identification number may be used to verify that the electronic content can be communicated during the electronic meeting 302.

In some embodiments, the management application 114 can detect an additional entity 406 that lacks an authorization for accessing the electronic meeting 302. The management application 114 can restrict the communication of at least some of the electronic content among at least some of the entities 304a-c based on detecting the additional entity 406, as described above with respect to FIG. 4.

In some embodiments, the management application 114 can determine that the entities 304a, 304b are respectively accessing the electronic meeting 302 via authorized computing devices 104a, 104b. The management application 114 can permit communication of the resources 202 and/or other electronic content based on determining that each of the computing devices 104a, 104b is authorized to access the electronic meeting 302. Determining that each of the computing device 104a, 104b is authorized to access the electronic meeting 302 can include, for example, determining that each computing device 104a, 104b is compliant with at least one of the rules 207.

Figure 6:
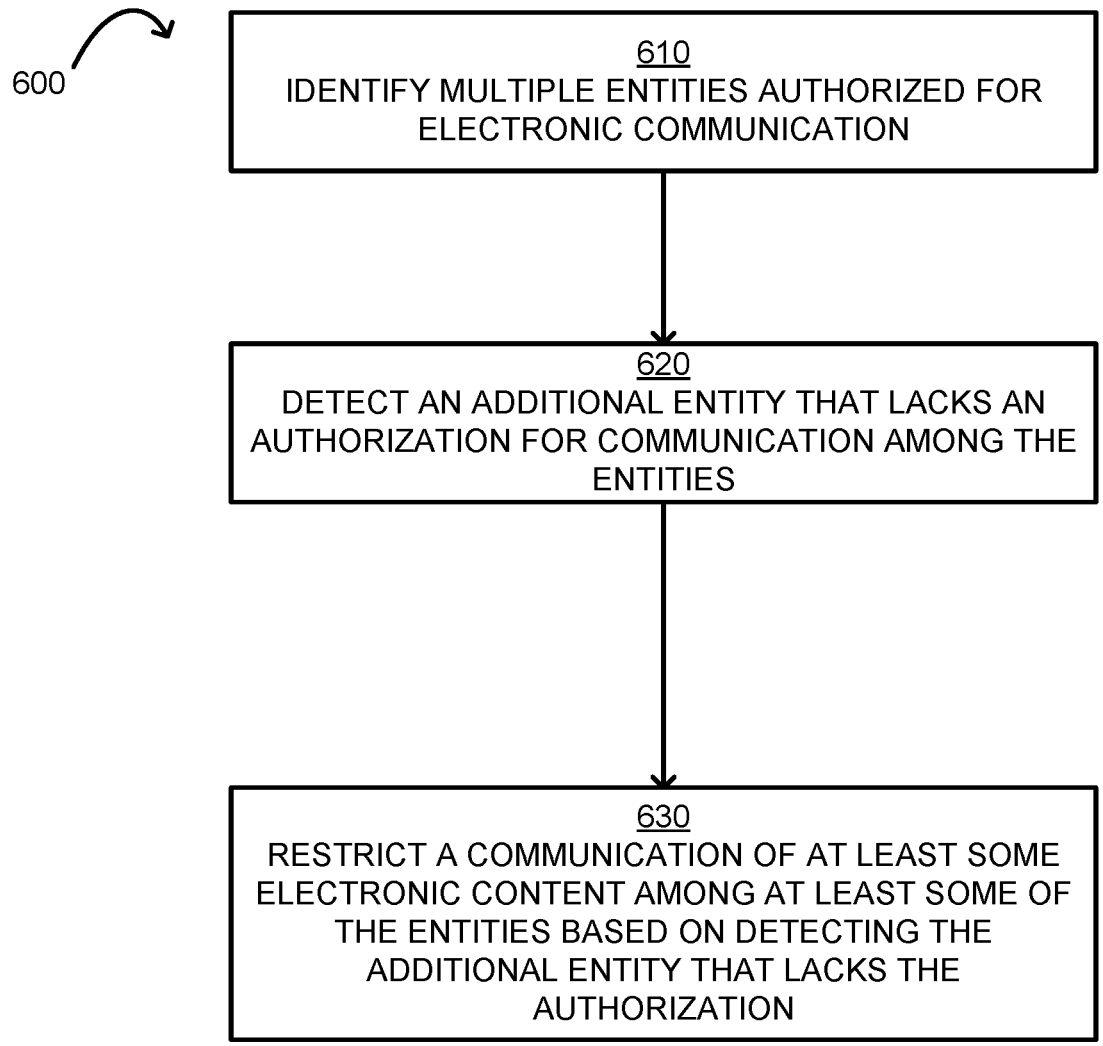
FIG. 6 is a flow chart illustrating an example method for restricting access to resources communicated among computing devices based on the presence of an unauthorized entity according to some embodiments.

FIG. 6 is a flow chart illustrating an example method 600 for restricting access to resources 202 and/or other electronic content communicated among computing devices 104a-c based on the presence of an unauthorized entity 406. For illustrative purposes, the method 600 is described with reference to the system implementations depicted in FIGS. 1-2 and the flows of communication depicted in FIGS. 3-4. Other implementations, however, are possible.

The method 600 involves identifying multiple entities authorized to electronically communicate with one another, as shown in block 610. For example, the processor 108 of the server system 102 can execute the management application 114 to identify that the entities 304a-c are authorized to access the electronic meeting 302. The management application 114 can identify that the entities 304a-c are authorized to access the electronic meeting 302 by, for example, referencing a listing 308 and/or by verifying that the entities 304a-c have provided valid authentication data.

The method 600 further involves detecting an additional entity that lacks an authorization for communicating with the entities, as shown in block 620. For example, the processor 108 of the server system 102 can detect an additional entity 406 that lacks an authorization for accessing the electronic meeting 302, as described above with respect to FIG. 4.

In some embodiments, detecting the unauthorized entity 406 can include determining that a computing device 402 corresponding to the unauthorized entity 406 (e.g., a user that is not authorized to access the meeting) is positioned in the same geographical location as other computing devices 104a-c authorized to access the meeting. The geographical location can be a defined by reference to a specific area, such as a boardroom, and/or a proximity to the other computing devices 104a-c (e.g., within 200 feet of the other computing devices 104a-c).

In some embodiments, the management application 114 can detect the unauthorized entity 406 based on the unauthorized entity 406 unsuccessfully attempting to access the electronic meeting 302. In one non-limiting example, the management application 114 can determine that authentication data provided by the entity 406 is invalid. The management application 114 may execute at least one remedial action for a managed computing device 402 in response to a threshold number of failed attempts by an entity to access the meeting using invalid authentication data. In another non-limiting example, the management application 114 can determine that the entity 406 is not included on a listing 308 of the entities authorized to access the electronic meeting 302. In another non-limiting example, the management application 114 can determine that a request from the entity to access the electronic meeting 302 has a timestamp outside a designated time period for the electronic meeting 302.

In some embodiments, the management application 114 can determine that the computing device 402 is not authorized to access the electronic meeting, regardless of whether the operator of the computing device 402 is authorized to access the meeting. For example, the management application 114 can determine that a computing device 402 is not authorized to access the electronic meeting based on the computing device 402 being non-compliant with at least one rule governing access to the resources 202 and/or other electronic content used for the electronic meeting.

The method 600 involves restricting a communication of at least some electronic content among at least some of entities 304a-c based on detecting the additional entity that lacks authorization, as shown in block 630. For example, the processor 108 of the server system 102 can restrict communication among the entities 304a-c in an electronic meeting 302 and/or other form of electronic communication, as described above with respect to FIG. 4.

In some embodiments, the management application 114 can perform at least one remedial action in response to detecting an unauthorized computing device 402 accessing the electronic meeting 302, attempting to access the electronic meeting 302, and/or being positioned in the vicinity of other computing devices 104a-c authorized to access the electronic meeting 302. In one non-limiting example, the remedial action includes transmitting a software update to the computing device 402. The software update can bring the computing device 402 into compliance with at least one rule governing access to resources shared via the electronic meeting 302, such as the rules 207. In another non-limiting example, the remedial action includes transmitting a command to an instance of the client application 124 executing on the computing device 402. The command directs the client application 124 to erase some or all content and/or applications from the computing device 402 (i.e., perform a partial or total "device wipe"). In another non-limiting example, the remedial action includes transmitting a command directing the client application 124 to lock the computing device 402. Locking the computing device 402 can include preventing an operator of the computing device from accessing at least one application on the computing device 402.

Although the description of FIGS. 1-6 involves the server system 102 providing at least one of the resources 202, other implementations are possible. For example, an additional enterprise level computing device may store and provide at least one of the resources 202 based on commands from the management application 114.

Although the server system 102 is depicted as a single server in FIGS. 1-2 for purposes of simplicity, the server system 102 can include multiple servers performing multiple functions. In some embodiments, the server system 102 can include a proxy server function and/or a compliance server function. The proxy server function may include providing a proxy service. As used herein, the term "proxy service" is used to refer to computer-executable instructions for performing the at least one function for authenticating access credentials and device identifiers. The proxy service may be executed to receive an access request from a computing device for accessing resources 202 and to determine whether to grant or deny the access request. Based on determining that the access request is granted, the proxy service may associate a computing device with access credentials to access resources 202 provided by and/or accessible via the server system 102.

In some embodiments, a proxy server function may communicate with a compliance server function, such as a compliance service, to authorize a computing device 104 by determining whether the computing device 104 complies with hardware, software, device management restrictions, and the like, as defined in a set of rules 207. As used herein, the term "compliance service" is used to refer to computer-executable instructions for performing the functionality described herein for authorizing the device characteristics of the requesting device. For instance, the compliance service may identify the device characteristics from a device profile listing of hardware restrictions, software restrictions, and/or computing device management restrictions for a given computing device.

The foregoing description of the aspects, including illustrated examples, has been presented only for the purpose of illustration and description and is not intended to be exhaustive or limiting to the precise forms disclosed. Many variations and modifications may be made to the above-described examples without departing substantially from the spirit and principles of the disclosure. All such modifications and variations are intended to be included herein within the scope of this disclosure and protected by the following claims.

The flowcharts described herein show certain functionality and operations performed by the management application 114 and the client application 124, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 108 and 118 in a computer system or other system. The machine code may be converted from the source code, etc. If embodied in hardware, each block may represent a circuit or a number of interconnected circuits to implement the specified logical function(s).

Although the flowcharts described herein show a specific order of execution, it is understood that the order of execution may differ from that which is depicted. For example, the order of execution of two or more steps may be scrambled relative to the order shown. Also, two or more blocks shown in succession in the flow charts may be executed concurrently or with partial concurrence. Further, in some embodiments, one or more of the steps shown in the flow charts may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Any logic or application described herein that comprises software or code can be embodied in any non-transitory computer-readable medium for use by or in connection with a computing system such as, for example, a processor in a computer system or other system. In this sense, the logic may comprise, for example, statements including instructions and declarations that can be fetched from the computer-readable medium and executed by a computing system.

In the context of the present disclosure, a "computer-readable medium" can include any medium that can contain, store, maintain, or otherwise include the logic or application described herein for use by or in connection with a computing system. The computer-readable medium can comprise any one of many physical media such as, for example, magnetic, optical, or semiconductor media. More specific examples of a suitable computer-readable medium can include, but are not limited to, magnetic tapes, magnetic floppy diskettes, magnetic hard drives, memory cards, solid-state drives, USB flash drives, optical discs, etc. The computer readable medium may be a random access memory ("RAM"). Examples of a RAM can include (but are not limited to) static random access memory ("SRAM"), dynamic random access memory ("DRAM"), magnetic random access memory ("MRAM"), etc. The computer-readable medium may be a read-only memory ("ROM"), a programmable read-only memory ("PROM"), an erasable programmable read-only memory ("EPROM"), an electrically erasable programmable read-only memory ("EEPROM"), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and the following claims.

Therefore, the following is claimed:

1. A method, comprising:
    transmitting, by a client application executed by a computing device, a request to access at least one resource, the request being transmitted to a management application executed by a server system, the request being transmitted to the management application through a network connection with the computing device and including a device profile describing a security attribute of the computing device, credentials associated with a user of the computing device, and an identifier associated with the computing device, wherein the client application is configured to prevent access to the at least one resource by at least one additional application executed by the computing device;
    receiving, by the client application, the at least one resource;
    receiving, by the client application, at least one rule defining at least one requirement that must be satisfied for the client application to provide access to the at least one resource, the at least one rule requiring that a mobile device management module be installed on the computing device, that the computing device be in communication with the management application through the network connection, and that at least one additional computing device associated with a required entity be accessing the at least one resource;
    determining, by the client application, that at least a portion of the at least one rule is not satisfied by detecting that the at least one additional computing device is unavailable on the network connection; and,
    causing, by the client application, the at least one resource to be inaccessible by the computing device.

2. The method of claim 1, wherein causing the at least one resource to be inaccessible by the computing device comprises causing the at least one resource to be erased from the computing device.

3. The method of claim 1, wherein causing the at least one resource to be inaccessible by the computing device comprises causing the client application to be erased from the computing device.

4. The method of claim 1, wherein causing the at least one resource to be inaccessible by the computing device comprises causing a device wipe to be performed.

5. The method of claim 1, wherein causing the at least one resource to be inaccessible by the computing device comprises causing the computing device to be locked.

6. The method of claim 1, further comprising:
    causing, by the client application, a notification to be transmitted to an administrative entity associated with the at least one resource.

7. The method of claim 1, further comprising:
    causing, by the client application, a software update to be installed on the computing device.

8. A non-transitory computer readable medium comprising executable instructions, which when executed by a processor, cause the processor to perform a method comprising:
    transmitting, by a client application executed by a computing device, a request to access at least one resource, the request being transmitted to a management application executed by a server system, the request being transmitted to the management application through a network connection with the computing device and including a device profile describing a security attribute of the computing device, credentials associated with a user of the computing device, and an identifier associated with the computing device, wherein the client application is configured to prevent access to the at least one resource by at least one additional application executed by the computing device;
    receiving, by the client application, the at least one resource;
    receiving, by the client application, at least one rule defining at least one requirement that must be satisfied for the client application to provide access to the at least one resource, the at least one rule requiring that a mobile device management module be installed on the computing device, that the computing device be in communication with the management application through the network connection, and that at least one additional computing device associated with a required entity be accessing the at least one resource;
    determining, by the client application, that at least a portion of the at least one rule is not satisfied by detecting that the at least one additional computing device is unavailable on the network connection; and,
    causing, by the client application, the at least one resource to be inaccessible by the computing device.

9. The non-transitory computer readable medium of claim 8, wherein causing the at least one resource to be inaccessible by the computing device comprises causing the at least one resource to be erased from the computing device.

10. The non-transitory computer readable medium of claim 8, wherein causing the at least one resource to be inaccessible by the computing device comprises causing the client application to be erased from the computing device.

11. The non-transitory computer readable medium of claim 8, wherein causing the at least one resource to be inaccessible by the computing device comprises causing a device wipe to be performed.

12. The non-transitory computer readable medium of claim 8, wherein causing the at least one resource to be inaccessible by the computing device comprises causing the computing device to be locked.

13. The non-transitory computer readable medium of claim 8, further comprising:
    causing, by the client application, a notification to be transmitted to an administrative entity associated with the at least one resource.

14. The non-transitory computer readable medium of claim 8, further comprising:
    causing, by the client application, a software update to be installed on the computing device.

15. A system comprising:
    at least one processor; and
    a non-transitory computer-readable medium in communication with the at least one processor, wherein the at least one processor is configured to execute instructions embodied in the computer-readable medium to perform operations comprising:

transmitting, by a client application executed by a computing device, a request to access at least one resource, the request being transmitted to a management application executed by a server system, the request being transmitted to the management application through a network connection with the computing device, and including a device profile describing a security attribute of the computing device, credentials associated with a user of the computing device, and an identifier associated with the computing device, wherein the client application is configured to prevent access to the at least one resource by at least one additional application executed by the computing device;

receiving, by the client application, the at least one resource;

receiving, by the client application, at least one rule defining at least one requirement that must be satisfied for the client application to provide access to the at least one resource, the at least one rule requiring that a mobile device management module be installed on the computing device, that the computing device be in communication with the management application through the network connection, and that at least one additional computing device associated with a required entity be accessing the at least one resource;

determining, by the client application, that at least a portion of the at least one rule is not satisfied by detecting that the at least one additional computing device is unavailable on the network connection; and, causing, by the client application, the at least one resource to be inaccessible by the computing device.

16. The system of claim 15, wherein causing the at least one resource to be inaccessible by the computing device comprises causing the at least one resource to be erased from the computing device.

17. The system of claim 15, wherein causing the at least one resource to be inaccessible by the computing device comprises causing the client application to be erased from the computing device.

18. The system of claim 15, wherein causing the at least one resource to be inaccessible by the computing device comprises causing a device wipe to be performed.

19. The system of claim 15, wherein causing the at least one resource to be inaccessible by the computing device comprises causing the computing device to be locked.

20. The system of claim 15, further comprising:

receiving, by the client application, a portion of an encryption key that has been divided between the computing device and the at least one additional computing device.

* * * * *